United States Patent
Beloskur et al.

(10) Patent No.: US 11,190,346 B2
(45) Date of Patent: Nov. 30, 2021

(54) SECURE DEVICE OWNERSHIP TRANSFER USING AN EPHEMERAL DEVICE TRANSFER TOKEN GENERATED USING ELLIPTIC CURVE CRYPTOGRAPHY

(71) Applicant: Lenovo Enterprise Solutions (Singapore) Pte. Ltd., Singapore (SG)

(72) Inventors: Douglas Beloskur, Cary, NC (US); Makoto Ono, Chapel Hill, NC (US); Igor Stolbikov, Apex, NC (US); Michael Demeter, Roswell, GA (US); Sudhir Shetty, Morrisville, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 87 days.

(21) Appl. No.: 16/688,333

(22) Filed: Nov. 19, 2019

(65) Prior Publication Data

US 2021/0152345 A1    May 20, 2021

(51) Int. Cl.
*H04L 9/30* (2006.01)
*H04L 9/32* (2006.01)
*H04L 9/08* (2006.01)

(52) U.S. Cl.
CPC .......... *H04L 9/0844* (2013.01); *H04L 9/0869* (2013.01); *H04L 9/3066* (2013.01); *H04L 9/3213* (2013.01)

(58) Field of Classification Search
CPC ... H04L 9/0844; H04L 9/0869; H04L 9/3066; H04L 9/3213; H04L 9/0841; H04L 9/0838; H04L 9/30; H04L 9/32; H04L 9/08
See application file for complete search history.

(56) References Cited

U.S. PATENT DOCUMENTS 10,169,587 B1* 1/2019 Nix .......................... G06F 21/57
2020/0380090 A1* 12/2020 Marion ................. H04L 9/3239

* cited by examiner

*Primary Examiner* — Quazi Farooqui
(74) *Attorney, Agent, or Firm* — Jeffrey Streets

(57) ABSTRACT

One or more device(s) is identified for which ownership of the device(s) is to be transferred from an identified transferor system to an identified transferee system. An ephemeral device transfer token is generated for the transferor using an elliptic-curve Diffie-Hellman cryptographic function, wherein the ephemeral device transfer token is only valid over a limited period of time to authorize a transfer of ownership of the device from the transferor to the transferee. The transferor then delivers the ephemeral device transfer token to the transferee. A device ownership record may be modified to transfer ownership of the device from the transferor to the transferee in response to receiving the ephemeral device transfer token from the transferee during the limited time period.

20 Claims, 11 Drawing Sheets

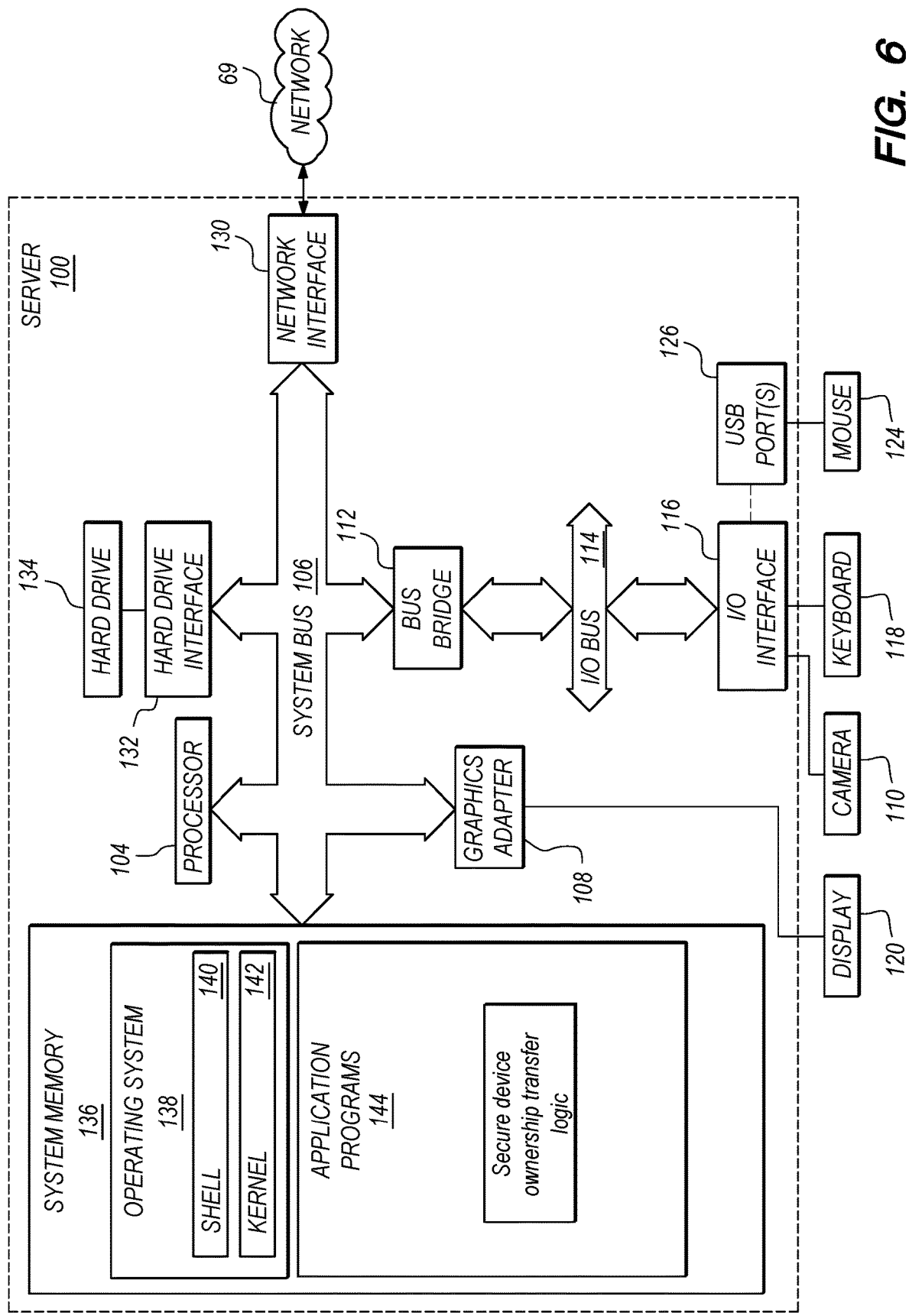

SECURE DEVICE OWNERSHIP TRANSFER USING AN EPHEMERAL DEVICE TRANSFER TOKEN GENERATED USING ELLIPTIC CURVE CRYPTOGRAPHY

BACKGROUND

The present disclosure relates to securely transferring ownership of a device in a computing cloud from one entity to another entity.

BACKGROUND OF THE RELATED ART

In a complex information technology (IT) environment there are circumstances in which it is beneficial to transfer ownership over one or more of the devices included in that environment. For example, when building a new cloud computing system, it may be desirable to have complex operating system needs installed and/or addressed by an expert in operating systems, cluster solution needs installed and/or addressed by an expert in hyper converged solutions, and enterprise software needs installed, set up and/or addressed by an expert in a specific domain. Since it is very difficult to manage everything vertically within a single organization, a horizontal solution with ecosystem partners may be implemented.

The security of each device in the computer system is typically designed around the identity of the device owner. Therefore, an authorized user within the owner's organization may access the device and data in the device. This access relies upon authentication of the user, perhaps using a username and password. Individuals that are not a part of the owner's organization are thus generally prevented from gaining access to the device or the data in the device. However, security methods that rely on user authentication or insecure device attributes may be spoofable or are otherwise unsecure.

BRIEF SUMMARY

Some embodiments provide a computer program product comprising a non-volatile computer readable medium and non-transitory program instructions embodied therein, wherein the program instructions are configured to be executable by a processor to cause the processor to perform various operations. The operations may comprise identifying a device under management for which ownership of the device is to be transferred from an identified transferor to an identified transferee, and generating an ephemeral device transfer token using an elliptic-curve Diffie-Hellman cryptographic function, wherein the ephemeral device transfer token is only valid over a limited period of time to authorize a transfer of ownership of the device from the transferor to the transferee. The operations may further comprise providing the ephemeral device transfer token to the transferor for delivery to the transferee, and modifying a device ownership record to transfer ownership of the device from the transferor to the transferee in response to receiving the ephemeral device transfer token from the transferee during the limited time period.

Some embodiments provide a computer program product comprising a non-volatile computer readable medium and non-transitory program instructions embodied therein, where the program instructions are configured to be executable by a processor to cause the processor to perform various operations. The operations may comprise identifying a plurality of devices under management for which ownership of each device is to be transferred from an identified transferor to an identified transferee, and generating, for each device, an ephemeral device transfer token as the output of an elliptic-curve Diffie-Hellman cryptographic function having input including an attribute of the device, wherein the ephemeral device transfer token for each device is only valid over a limited period of time to authorize a transfer of ownership of the device from the transferor to the transferee. The operations may further comprise forming a file containing, for each device, the device attribute and the ephemeral device transfer token, providing the file to the transferor for delivery to the transferee. Still further, the operations may comprise modifying, for each device, a device ownership record to transfer ownership of the device from the transferor to the transferee in response to receiving the file from the transferee during the limited time period, wherein the file received from the transferee contains, for each device, the ephemeral device transfer token.

BRIEF DESCRIPTION OF THE SEVERAL VIEWS OF THE DRAWINGS

FIG. 6 is a diagram of a server that may be representative of a transferor computing system, a transferee computing system, and/or a cloud portal computing system.

DETAILED DESCRIPTION

Figure 1:
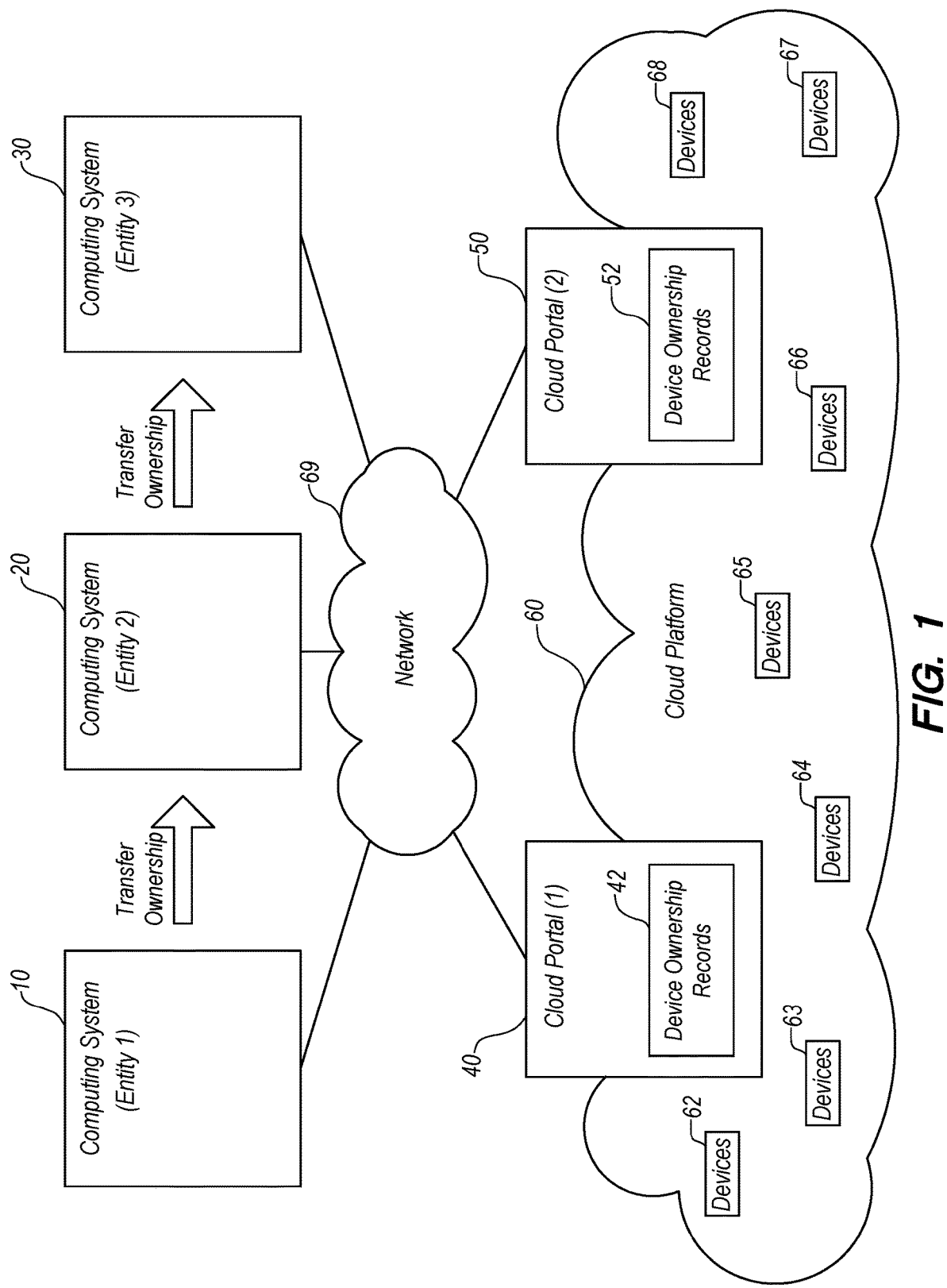
FIG. 1 is a diagram of multiple computing systems that may use a cloud portal to manage devices owned by each computing system.

Some embodiments provide a computer program product comprising a non-volatile computer readable medium and non-transitory program instructions embodied therein, wherein the program instructions are configured to be executable by a processor to cause the processor to perform various operations. The operations may comprise identifying a device under management for which ownership of the device is to be transferred from an identified transferor to an identified transferee, and generating an ephemeral device transfer token using an elliptic-curve Diffie-Hellman cryptographic function, wherein the ephemeral device transfer token is only valid over a limited period of time to authorize a transfer of ownership of the device from the transferor to the transferee. The operations may further comprise providing the ephemeral device transfer token to the transferor for delivery to the transferee, and modifying a device ownership record to transfer ownership of the device from the transferor to the transferee in response to receiving the ephemeral device transfer token from the transferee during the limited time period.

Some embodiments provide for securely transferring the ownership of one or more devices in a cloud from a first entity computing system (the identified transferor computing system) to a second entity computing system (the identified transferee computing system). The method may be used any number of times to securely transfer ownership of one or more devices from one entity computing system to another entity computing system, such as a first secure transfer of a group of devices from a first entity having expertise in operating system setup to a second entity having expertise in hyper converged software and a second secure transfer of the group of devices from the second entity to a third entity having expertise in an enterprise solution domain.

In some embodiments, the number of devices to be transferred may be substantial and suitable operations for securely transferring ownership should not be onerous on the first entity (the transferor) or the second entity (the transferee). For example, an enterprise cloud environment may have a large number of devices for which ownership may be transferred at one time. Some embodiments may be capable of transferring ownership of many devices in a single transaction, which may be referred to as a transfer in bulk. Still, the ownership transfer of each individual device must be secure to prevent an unauthorized third party from gaining ownership of a device and to prevent an improper transfer of an unintended device, an improper transfer to an unintended transferee, and/or an improper transfer that is no longer intended.

Some embodiments may enable a transfer of ownership of one or more device between a transferor entity (or simply "transferor") and a transferee entity (or simply a "transferee"), where the one or more device is a component of a cloud platform that is accessible through a cloud portal. Furthermore, ownership of devices may be securely transferred even if the devices are being transferred between two clouds in a multi-cloud environment, such as in the case of a hybrid cloud.

The term "ownership", as used in reference to an entity's relationship to a device, does not mean that an entity possesses legal title of the device, but rather that the entity has certain current rights of priority and control of the device. For example, the owner of a given device may perform actions on that device that may only be allowed to be taken by the owner. Non-limiting examples of actions that may only be allowed to be taken by the owner may include activating the device for operation, logging in to the device, installing a software application on the device, and/or erasing data from the device. Some embodiments may permit only the transferor to take an ownership action on the device prior to modifying the device ownership record, and may permit only the transferee to take the ownership action on the device subsequent to modifying the device ownership record.

In some embodiments, the ephemeral device transfer token may be generated using a first timestamp, a shared secret number, an attribute of the device, a transferor identity key, a transferee identity key, and a cloud portal identity key. Such embodiments may further include generating a verification token using the elliptic-curve Diffie-Hellman cryptographic function, wherein the verification token is generated using a second timestamp, the shared secret number, the attribute of the device, the opposite key of the transferor identity key, the opposite of the transferee identity key, and the opposite of the cloud portal identity key. The device ownership record may be modified to transfer ownership of the device from the identified transferor to the identified transferee in response to determining that the ephemeral device transfer token for the device received from the transferee is the same as the verification token.

Some embodiments may generate the ephemeral device transfer token in a specific manner that is agreed upon by parties to the ownership transfer prior to the transfer. Optionally, the generation and verification of an ephemeral device transfer token may be performed by source and destination cloud portals, respectively. In some embodiments, the source and destination cloud portals may be the same cloud portal managing devices for both the transferor and the transferee, such that, for example, an ephemeral device transfer token may be generated by performing the operations of: (1) obtaining a first elliptic-curve cryptography private seed as the output of a key derivation function having input including a first timestamp, a shared secret number, and a device attribute of the device; (2) obtaining a first ephemeral device transfer private key as the output of a cryptographically secure pseudo-random number generator using the first elliptic-curve cryptography private seed as input; (3) calculating a first authorization code as the output of the elliptic-curve Diffie-Hellman function having input from a transferor identity private key and a cloud portal identity public key; (4) calculating a second authorization code as the output of the elliptic-curve Diffie-Hellman function having input from the first ephemeral device transfer private key and the cloud portal identity public key; and (5) calculating a third authorization code as the output of the elliptic-curve Diffie-Hellman function having input from the first ephemeral device transfer private key and a transferee public key, wherein the ephemeral device transfer token for the device is the output of the key derivation function having input including the first authorization code (code 1), the second authorization code (code 2), and the third authorization code (code 3). Embodiments may repeat these operations for each device for which ownership is being transferred. Optionally, the operations may further include obtaining a first ephemeral device transfer public key as the output of a public key generator using the first ephemeral device transfer private key and predetermined elliptic-curve parameters. However, some embodiments of the generating the ephemeral device transfer token may not require use of the first ephemeral device transfer public key.

In some embodiments, the operation of modifying the device ownership record to transfer ownership of the device from the identified transferor to the identified transferee is performed only upon verification of the ephemeral device transfer token for the device received from the transferee. The verification process is used to make sure that the ephemeral device transfer token is valid for a transfer of ownership of the identified device from the identified transferor to the identified transferor and that the ephemeral device transfer token has been presented within the limited period of time incorporated into the ephemeral device transfer token.

In some embodiments, verification may include: (1) obtaining a second elliptic-curve cryptography private seed as the output of the key derivation function having input including a second timestamp, the shared secret number, and the device attribute of the device; (2) obtaining an ephemeral device transfer private key as the output of the cryptographically secure pseudo-random number generator using the elliptic-curve cryptography private seed as input; (3) obtaining an ephemeral device transfer public key as the output of a public key generator using the ephemeral device transfer private key and predetermined elliptic-curve parameters; (4) calculating a first authorization code as the output of the elliptic-curve Diffie-Hellman function having input from a transferor identity public key and a cloud portal identity private key; (5) calculating a second authorization code as the output of the elliptic-curve Diffie-Hellman function having input from the ephemeral device transfer public key and the cloud portal identity private key; and (6) calculating a third authorization code as the output of the elliptic-curve Diffie-Hellman function having input from the ephemeral device transfer public key and a transferee private key, wherein the ephemeral device transfer token for the device is the output of a key derivation function having input including the first authorization code, the second authorization code, and the third authorization code.

In some embodiments, the ephemeral device transfer token for the device is received over a first communication medium and the shared secret number is received over a second communication medium that is different from the first communication medium. For example, the first and second communication mediums may include email, instant messaging, text messaging, phone call, or shared cloud storage. It should be appreciated that the ephemeral device transfer token is essentially useless to the transferee or destination cloud portal without also having access to the device attribute of the device and the shared secret number, because the generation of the verification token requires a device attribute and a shared secret number. If the device attribute and the shared secret number are not the same as used in the generation of the ephemeral device transfer token for the particular device, then the verification token will not match the ephemeral device transfer token.

In some embodiments, the first timestamp is captured by the transferor or source cloud portal at the time that the first elliptic-curve cryptography private seed is obtained, and the second timestamp is captured by the transferee or destination cloud portal at the time that the second elliptic-curve cryptography private seed is obtained. If the first and second timestamps do not have the same output, then the resulting first and second elliptic-curve cryptography private seeds will be different. However, the timestamps may have the same value, for example, over the period of one calendar day if the both timestamps use the current calendar date.

In some embodiments, the device attribute may be any one or more device attribute, such as a hardware attribute, a firmware attribute and/or a software attribute of the device. Non-limiting examples of the device attribute include a device serial number, device model number, device Media Access Control (MAC) address, device memory serial number, Secure Digital (SD) card attribute, and/or Trusted Platform Module (TPM) attribute.

Some embodiments are adapted to enable ownership of a plurality of devices to be transferred from a transferor to the transferee. One such embodiment includes a computer program product comprising a non-volatile computer readable medium and non-transitory program instructions embodied therein, where the program instructions are configured to be executable by a processor to cause the processor to perform various operations. The operations may comprise identifying a plurality of devices under management for which ownership of the device is to be transferred from an identified transferor to an identified transferee, and generating, for each device, an ephemeral device transfer token as the output of an elliptic-curve Diffie-Hellman cryptographic function having input including an attribute of the device, wherein the ephemeral device transfer token for each device is only valid over a limited period of time to authorize a transfer of ownership of the device from the transferor to the transferee. The operations may further comprise forming a file containing, for each device, the device attribute and the ephemeral device transfer token, providing the file to the transferor for delivery to the transferee. Still further, the operations may comprise modifying, for each device, a device ownership record to transfer ownership of the device from the transferor to the transferee in response to receiving the file from the transferee during the limited time period, wherein the file received from the transferee contains, for each device, the ephemeral device transfer token.

In some embodiments, for each of the plurality of devices for which ownership is being transferred, the ephemeral device transfer token is generated using a first timestamp, a shared secret number, an attribute of the device, a transferor identity key, a transferee identity key, and a cloud portal identity key. The operations may further comprise generating, for each of the plurality of devices, a verification token using the elliptic-curve Diffie-Hellman cryptographic function, wherein, for each of the plurality of devices, the verification token is generated using a second timestamp, the shared secret number, the attribute of the device received in the file, the opposite key of the transferor identity key, the opposite of the transferee identity key, and the opposite of the cloud portal identity key. Still further, for each of the plurality of devices, the operation of modifying the device ownership record to transfer ownership of the device from the identified transferor to the identified transferee may be performed in response to determining that the ephemeral device transfer token for the device received from the transferee is the same as the verification token generated for the device.

In some embodiments, for each of the plurality of devices, the ephemeral device transfer token for the device may be generated by: (1) obtaining a first elliptic-curve cryptography private seed as the output of a key derivation function having input including a first timestamp, a shared secret number, and the device attribute of the device; (2) obtaining a first ephemeral device transfer private key as the output of a cryptographically secure pseudo-random number generator using the first elliptic-curve cryptography private seed as input; (3) calculating a first authorization code as the output of the elliptic-curve Diffie-Hellman function having input from a transferor identity private key and a cloud portal identity public key; (4) calculating a second authorization code as the output of the elliptic-curve Diffie-Hellman function having input from the first ephemeral device transfer private key and the cloud portal identity public key; and (5) calculating a third authorization code as the output of the elliptic-curve Diffie-Hellman function having input from the first ephemeral device transfer private key and a transferee public key, wherein the ephemeral device transfer token for the device is the output of the key derivation function having input including the first authorization code, the second authorization code, and the third authorization code.

In some embodiments, for each of the plurality of devices, the operation of modifying the device ownership record to transfer ownership of the device from the identified transferor to the identified transferee is performed only in response to verification of the ephemeral device transfer token for the device received from the transferee. In one example, for each of the plurality of devices, verification may include: (1) obtaining a second elliptic-curve cryptography private seed as the output of the key derivation function having input including a second timestamp, the shared secret number, and the device attribute of the device received in the file; (2) obtaining a second ephemeral device transfer private key as the output of the cryptographically secure pseudo-random number generator using the second elliptic-curve cryptography private seed as input; (3) obtaining a second ephemeral device transfer public key as the output of the public key generator using the second ephemeral device transfer private key and the predetermined elliptic-curve parameters; (4) calculating a first authorization code as the output of the elliptic-curve Diffie-Hellman function having input from a transferor identity public key and a cloud portal identity private key; (5) calculating a second authorization code as the output of the elliptic-curve Diffie-Hellman function having input from the second ephemeral device transfer public key and the cloud portal identity private key; and (6) calculating a third authorization code as the output of the elliptic-curve Diffie-Hellman function having input from the second ephemeral device transfer public key and a transferee private key, wherein the verification token for the device is the output of a key derivation function having input including the first authorization code, the second authorization code, and the third authorization code.

In some embodiments, the transferor is a current owner of one or more device and the transferee is a potential future owner of the one or more device. Typically, a person acting on behalf of the transferor will initiate the transfer of ownership by providing input to an interface formed by the computer program product according to an embodiment. For example, the transferor may manually enter or select the one or more devices for which the transferor wants to transfer ownership to the transferee. In some embodiments, the ephemeral device transfer token(s) and/or a file containing the ephemeral device transfer token(s) may be generated by components of the computer program product performed on the computer system of the transferor and/or by components of the computer program product performed on the computer system of the cloud portal that manages the one or more devices of the transferor. In this respect, the cloud portal that manages the one or more devices of the transferor may be considered to be an agent that takes instructions from the transferor, such that the transferor may initiate a transfer of ownership by providing input to the cloud portal. In other words, the cloud portal may provide a secure ownership transfer as a service to the transferor. So, various operations of some embodiments may be directly performed by the transferor and/or may be performed by the cloud portal on behalf of the transferor.

In some embodiments, the transferee is a necessary participant in the transfer of ownership of the one or more device. For example, the transferee may need to initially inform the transferor or the source cloud portal of the identity of the cloud portal that manages, or will manage, the one or more devices for which ownership is to be transferred to the transferee. The identity of the destination cloud portal enables the transferor or source cloud portal to incorporate the public key of the appropriate cloud portal into the generation of the ephemeral device transfer token(s).

In some embodiments, the transferee may receive the ephemeral device transfer token for each device and the associated device attribute(s) for each device (collectively "transfer information") from the transferor, and provide the transfer information to the destination cloud portal. Furthermore, if the destination cloud portal does not yet have the shared secret number (i.e., PIN), which the transferor has used to generate the ephemeral device transfer token(s), then the transferee may also provide that shared secret number. In some embodiments, the transferee may further provide the destination cloud portal with the transferee identity private key, which may be needed so that the destination cloud portal may generate the verification token for each device. Alternatively, the transferee may perform some or all of the calculations that involve the device attributes and PIN, such as the generation of the ECC private seed that is to be used in the verification process and/or the authorization code (i.e., code 3) that requires the transferee identity private key for generation of the verification token(s).

Accordingly, the computer program product that executes the verification process may include some components performed on the computer system of the transferee and/or some components performed on the computer system of the cloud portal that manages the one or more devices of the transferee. In this respect, the cloud portal that manages the one or more devices of the transferee may be considered to be an agent that takes instructions from the transferee, such that the transferee may direct the cloud portal to accept a transfer of ownership of the one or more device. In other words, the cloud portal may provide a secure ownership transfer as a service to the transferee. So, various operations of some embodiments may be directly performed by the transferee and/or may be performed by the cloud portal on behalf of the transferee.

As mentioned previously, some embodiments may transfer ownership of one or more device from the transferor to the transferee, where a single cloud portal will manage the one or more device both before and after the transfer of ownership. In other words, a cloud portal that manages the one or more device for the transferor before the transfer of ownership will also manage the one or more devices for the transferee after the transfer of ownership. In such a situation, the single cloud portal may be considered to serve as both a source cloud portal and a destination cloud portal. By contrast, some embodiments may transfer ownership of the one or more device from the transferor to the transferee, where a first cloud portal (the source cloud portal) manages the one or more device before the transfer of ownership (for the transferor) and a second cloud portal (the destination cloud portal) manages the one or more device after the transfer of ownership (for the transferee). In the case that separate source and destination cloud portals are involved in the transfer of ownership, an additional authorization code may be included as input to the key derivation function that generates the ephemeral device transfer token and, similarly, an additional authorization code may be included as input to the key derivation function that generates the verification token. The additional authorization code, such as a fourth authorization code, may be included in order to bind the transfer of ownership to the destination cloud. The use of an additional authorization code is discussed in greater detail below in reference to Use Case 2.

In some embodiments, the operations may make use of a plurality of inputs, such as a device attribute for an individual device, the public/private identity keys of the transferor, the public/private identity keys of the transferee, the public/private identity keys of the cloud portal, an authorization PIN or shared secret number, and/or a timestamp. The term "public/private identity keys" or "identity key-pair" as used herein refers to a public key and a private key that uniquely identify an entity.

In some embodiments, an ECC private seed for each device may be generated using a combination of the following parameters as input to a key derivation function (KDF):

1. A device attribute may include, but is not limited to, a device serial number, device model number, device Media Access Control (MAC) addresses, device memory serial number, Secure Digital (SD) card attributes, Trusted Platform Module (TPM) attributes, and/or other hardware, firmware and/or software attributes, including operating system attributes, that may uniquely identify the device, either alone or in combination. One or more device attribute may be input to the key derivation function. Furthermore, the one or more device may be a server, switch, storage area network, network attached storage, and/or other device that may be managed by a cloud computing system.

2. A shared secret number, such as a personal identification number (PIN), may also be used in the key derivation function. The shared secret number is preferably a secure, randomly generated number, but this is not required. For a successful transfer of ownership of a device, the shared secret number must be known to the transferor that is transferring ownership, the transferee that is receiving the transfer of ownership, and the cloud portal(s) involved in the transfer of ownership. The shared secret number may be generated or selected by any of the entities involved in the transfer of ownership (i.e., transferor, transferee, or cloud portal), but the transferor entity may be designated to generate or select the shared secret number since the transferor may be initiating the transfer of ownership and will need the shared secret number before the transferee or destination cloud portal will need the shared secret number. The entities that are party to the transfer of ownership may communicate the shared secret number among themselves (such as from the transferor to the transferee and to the cloud portal) in any manner. For example, one entity may communicate the shared secret number to another entity via a phone call, internet call, text message, electronic mail message, in-person message, or other mode of communication. If it is the transferor communicating the shared secret number to the transferee, the shared secret number is preferably provided in a communication that is separate from the ephemeral device transfer token(s) and more preferably over a communication channel that is different than, or out-of-band from, the communication channel used to send the ephemeral device transfer token(s).

3. A timestamp of the transfer may be used to limit the amount of time over which the ephemeral device transfer token is valid. The input of a timestamp into the key derivation function is what causes the ephemeral device transfer tokens to be "ephemeral" or "lasting over a defined duration." For example, if the ephemeral device transfer token for a device is generated by the transferor based on a timestamp that is a particular date (i.e., Jan. 2, 2020), then the cloud portal will only be able to compute a verification token that is identical to the ephemeral device transfer token generated by the transferor if the cloud portal does the computation using the same particular date (i.e., Jan. 2, 2020). Embodiments may cause the cloud portal to only use the current date at the time that the ephemeral device transfer token is received from the transferee, such that the cloud portal will only verify the ephemeral device transfer token, and implement the transfer of device ownership, if the cloud portal receives the ephemeral device transfer token from the transferee on the particular date (or other time period specified by the timestamp) that the transferor used when the transferor generated the ephemeral device transfer token. Optionally, the timestamp may describe a narrower period of time, such as a particular hour of a particular date, or a broader period of time, such as a particular month. However, the period of time described by the timestamp is preferably agreed upon between the transferor and the transferee. The ephemeral nature of the ephemeral device transfer tokens may prevent a third party from making unauthorized and malicious use of the ephemeral device transfer tokens should the third party obtain the tokens and attempt to make use of the tokens at a point in time that falls outside of the period identified by the timestamp.

The above listed parameters (device attribute, PIN, timestamp) may be used in the key derivation function (KDF) to calculate an Elliptic-Curve Cryptography (ECC) private seed value. This may be represented by the following equation:

$$\text{ECC private seed} = \text{KDF}(\text{device attributes}, \text{PIN}, \text{timestamp})$$

Non-limiting examples of a key derivation function may include a cryptographic hash function. Specific examples of a key derivation function include Password-Based Key Derivation Function 2 (PBKDF2), bcrypt and argon2. The ECC private seed is private to the entity (i.e., the transferor or source cloud portal) generating the ephemeral device transfer token, meaning that the transferor or source cloud portal keeps the ECC private seed secret, even from the other entities (i.e., the transferee or destination cloud portal) involved in the transfer of ownership. Where the same cloud portal manages device for the transferor and transferee, and also provides ownership transfer as a service to both the transferor and transferee, the cloud portal may run separate instances or components of the computer program for transferor and transferee, such that the ECC private seed used for generation of the ephemeral device transfer token is not available for use in the generation of the verification token. Rather, the ECC private seed used in generation of the ephemeral device transfer token and the ECC private seen used in generation of the verification token are independently generated and used, albeit using similar operations.

A cryptographically secure pseudo-random number generator (CSPRNG) is a pseudo-random number generator (PRNG) that is suitable for use in cryptography. The ECC private seed may be input to a CSPRNG function to generate an ephemeral device transfer private key. For example:

$$\text{Ephemeral device transfer private key} = \text{CSPRNG}(\text{ECC Private Seed})$$

If the entity generating the ephemeral device transfer token doesn't need the ephemeral public key for a device, then it is not necessary for that entity to calculate the ephemeral device public key. In some embodiments, the transferor or source cloud portal uses the ephemeral device transfer private key, but does not use an ephemeral device transfer public key. However, in such embodiments the transferee or destination cloud portal may generate and use an ephemeral device transfer public key for each device that is being transferred. For example, a "generateeccpublickey" function may utilize an agreed-upon ECC-Curve and receive the ephemeral device transfer private key as input. The agreed-upon ECC-Curve may be described by certain ECC-Curve parameters or an ECC-Curve identifier, where the ECC-Curve identifier defines the parameters of the ECC-Curve and is a common way of selecting the parameters.

> Ephemeral public key for a device=generateeccpublickey(ephemeral device private key,ECC-Curve parameters/identifier)

After calculating or generating at least the ephemeral private key for a device, the transferor may then generate an ephemeral device transfer token for the device. The method or operations for generating the ephemeral device transfer token may vary depending upon whether or not the transfer of ownership of the device from the transferor to the transferee will further involve transferring management of the device from a first (source) cloud portal to a second (destination) cloud portal. Each of the devices owned by an entity, such as the transferor or the transferee, are managed by a cloud portal. However, for any given transfer of ownership of a device from a transferor to a transferee, a first possible situation (i.e., Use Case 1) is that the devices owned by the transferor and the device owned by the transferee are both managed by the same cloud portal (i.e., the first cloud portal). In this first possible situation, the ownership of the device will change from the transferor to the transferee, but the management of the device will remain with the same cloud portal (i.e., the first cloud portal) before and after the transfer. However, a second possible situation (i.e., Use Case 2) is that the devices owned by the transferor are managed by the first cloud portal and the device owned by the transferee are managed by a second cloud portal. In this second possible situation, the ownership of the device will change from the transferor to the transferee, while the management of the device will change from the first (source) cloud portal before the transfer to a second (destination) cloud portal after the transfer. The generation of the ephemeral device transfer token for a device is discussed below for each of the two Use Cases.

Furthermore, after the transferor or source cloud portal generates an ephemeral device transfer token for each of the one or more devices for which ownership is being transferred, the transferor provides each of the one or more corresponding ephemeral device transfer token(s) to the transferee. For example, the ephemeral device transfer tokens may be included in a file, such as a comma-separated values (CSV) file, that is sent from the transferor to the transferee. In addition, the transferor provides certain device attribute information to the transferee. The device attribute information includes the one or more device attribute that has been used in the key derivation function to obtain the ECC private seed, but the device attribute information may also include additional device attributes and/or a device identifier that may or may not be used in the key derivation function. However, where additional device attributes are included, the device attribute information should identify which device attribute(s) were used in the key derivation function to obtain the ECC private seed so that the transferee or destination cloud portal may independently use the same device attribute(s) in the key derivation to obtain an ECC private seed. Optionally, the transferor may provide the transferee with a file that includes, for each device for which ownership is being transferred, both the device attribute(s) and the ephemeral device transfer token.

In some embodiments, the cloud portal that manages the devices owned by the transferor may, on behalf of the transferor, generate the ephemeral device transfer token for each device for which ownership is being transferred. More specifically, the cloud portal that manages the devices owned by the transferor may, on behalf of the transferor, perform any one or more calculation that is necessary to generate the ephemeral device transfer token for each device for which ownership is being transferred. For example, the cloud portal may generate, for each device for which ownership is being transferred, the ECC private seed, the ephemeral device transfer private/public key pair, the authorization codes, and/or the ephemeral device transfer token. Because the cloud portal that manages the devices owned by the transferor is an agent of the transferor, that particular cloud portal may have secure access to any information of the transferor that the cloud portal would need to perform calculations on behalf of the transferor. For example, the cloud portal that manages the devices owned by the transferor may even have access to, or may be able to obtain, the transferor's identity private key, which is needed for generating an ephemeral device transfer token. If the cloud portal has access to, or obtains, the identity private key of another entity, such as the transferor and/or transferee, then the cloud portal must store the key(s) securely. However, if the cloud portal does not have access to the transferor identity private key, the cloud portal could request that the transferor compute any authorization code (i.e., authorization code 1) requiring the transferor identity private key. Furthermore, it is possible for the cloud portal managing the device owned by the transferor to prepare the transfer information, such as a transfer information file, on behalf of the transferor and provide the transfer information to the transferor. The transferor may then provide the transfer information to a selected transferee.

Regardless of whether the ephemeral device transfer tokens are directly generated by the transferor or indirectly generated on behalf of the transferor by the cloud portal that manages the devices owned by the transferor, the transferor may then provide the ephemeral device transfer tokens to the transferee. Optionally, the transferor provides the ephemeral device transfer tokens to the transferee in a transfer information file along with various device attributes, which at least include the device attributes used in the generation of the ECC private seed for the device. For each of the one or more devices for which ownership is being transferred, such a transfer information file may include the one or more device attributes and the ephemeral device transfer token.

After the transferee receives the transfer information from the transferor, the transferee may then provide the transfer information to the cloud portal that manages the devices owned by the transferee. Furthermore, this cloud portal may then attempt to verify the transfer of ownership for each device for which the transfer information includes an ephemeral device transfer token.

The cloud portal attempting to verify the transfer of ownership (i.e., the cloud portal that manages devices owned by the transferee), will compute a verification token using a combination of information that the cloud portal already has, such as the cloud portal identity private key, and information that the cloud portal must obtain. In order to compute the verification token, the cloud portal must obtain the one or more device attributes in the transfer information, the shared secret number (or "PIN") that was used by the transferor or source cloud portal to generate the ECC private seed, a new timestamp, the agreed-upon ECC-Curve parameters, the transferor identity public key, and the transferee identity private key. Other intermediate values, such as the ECC private seed, ephemeral device transfer public/private keys, and authorization codes may be calculated. It should also be recognized that program instructions implementing the operations should, for any of the plurality of devices, invoke the same KDF and CSPRNG functions for generating the verification token as were used to generate the ephemeral device transfer token. Specifically, where the operations for generating an ephemeral device transfer token include two separate uses of a key derivation function (KDF), the two key derivation functions do not need to be the same. However, the entity generating the ephemeral device transfer function and the entity generating the verification token must both use the same KDF for generating the ECC private seed and must both use the same KDF to generate the ephemeral device transfer token and verification token.

In some embodiments, the cloud portal may obtain the one or more device attributes in the transfer information (including the device attributes and the device tokens), the shared secret number (or "PIN"), and the transferee's identity private key from the transferee. The shared secret number is preferably obtained through a separate channel or communication, such a phone call, text, email or in-person communication. The transferee's identity private key is preferably also obtained through a separate channel or communication, but may already be known to the cloud portal since it is an agent of the transferee. The agreed-upon ECC-Curve parameters may be obtained from either the transferor, transferee or some other third party entity, perhaps during setup. The transferor identity public key is publicly available from the transferor. The cloud portal preferably generates its own timestamp at the time that the cloud portal is generating the verification token(s).

The cloud portal that manages the devices owned by the transferee may then compute a separate verification token for each of the devices that are the subject of the ownership transfer. For any given device, if the verification token computed by the cloud portal is the same as (i.e., is equal in value to) the ephemeral device transfer token in the transfer information received from the transferee, then the transfer of ownership is verified and the cloud portal will then modify its device ownership record to reflect that the transferee is now the owner of the device. However, for any given device, if the verification token computed by the destination cloud portal is not the same as (i.e., is not equal in value to) the ephemeral device transfer token in the transfer information received from the transferee, then the transfer of ownership is not verified and the cloud portal will not modify its device ownership record such that the device ownership record will continue to identify the transferor as the owner of the device.

The transferee and/or destination cloud portal computes a verification token in a similar manner to the way that the transferor and/or transferor's cloud portal generated the ephemeral device transfer token. One difference is that the transferee and/or destination cloud portal, for example, uses its own timestamp as input in the calculation of the ECC private seed. The transferee or destination cloud portal would always be computing a verification token at a point in time after the transferor or source cloud portal has already generated the ephemeral device transfer token, since the transferee or transferee's cloud portal may compute a verification token in response to receiving transfer information, where the transferee received the transfer information from the transferor. However, if the timestamps are only specific as to a particular date, then the two timestamps will be the same so long as the destination cloud portal verifies the ownership transfer on the same day that the transferor or source cloud portal generated the ephemeral device transfer tokens.

Another difference in the way that the destination cloud portal computes a verification token, is that the destination cloud portal uses different keys when calculating the authorization codes that are used to derive the verification token (i.e., different keys from those used by the transferor or source cloud portal to calculate authorization codes). More specifically, the cloud portal that manages the devices owned by the transferee may not have access to the transferor identity private key. Even if a cloud portal manages the device owned by both the transferor and the transferee, that cloud portal may not be allowed to use the transferor identity private key for the purpose of verification since the verification is performed on behalf of the transferee. So, the destination cloud portal may calculate the authorization codes using keys that are the opposite of the keys that the transferor or source cloud portal used to calculate authorization codes. In this context, a private key of a particular public/private key-pair is considered to be the opposite of the public key from the particular public/private key-pair. Similarly, a public key of a particular public/private key-pair is considered to be the opposite of the private key from the particular public/private key-pair. For example, the cloud portal identity private key of the destination cloud portal is the opposite of the cloud portal identity public key of the destination cloud portal, and vice versa.

Because the cloud portal that manages the devices owned by the transferee is an agent of the transferee, that particular cloud portal may have secure access to any information of the transferee that the cloud portal would need to perform calculations on behalf of the transferee. For example, the cloud portal that manages the devices owned by the transferee may even have access to, or may be able to obtain, the transferee's identity private key, which may be needed for generating a verification token. If the destination cloud portal has access to, or obtains, the identity private key of another entity, such as the transferor and/or transferee, then the destination cloud portal must store the key(s) securely. However, if the destination cloud portal does not have access to the transferee identity private key, the destination cloud portal could request that the transferee compute any authorization code (i.e., authorization code 3) requiring the transferee identity private key.

For each device identified in the transfer information, the destination cloud portal computes a verification token using the one or more device attribute and the ephemeral transfer public key that are associated with the device in the transfer information. The destination cloud portal may then determine whether the self-computed verification token for the device matches the ephemeral device transfer token received in the transfer information in association with the device. If the two tokens match, then the verification of the received ephemeral device transfer token is successful and the ownership of the device may be transferred to the transferee. If the verification fails (i.e., the two tokens do not match), then the destination cloud portal will not enter or implement the transfer of ownership to the transferee, such that the ownership of the device remains with the transferor. Each cloud portal may maintain an ownership entry for each device that the cloud portal manages in a device ownership record, such as a database or table, to identify the current owner of each device. When the destination cloud portal verifies a transfer of ownership of a device to the transferee, the destination cloud portal may also send a secure message to the source cloud portal instructing that the source cloud portal should modify its device ownership record to show that the transferor is no longer the owner of the device.

Two Use Cases for Generating an Ephemeral Device Transfer Token

As discussed previously, the method or operations for generating the ephemeral device transfer token may vary depending upon whether or not the transfer of ownership of the device from the transferor to the transferee will further involve transferring management of the device from a first (source) cloud portal to a second (destination) cloud portal. Each of the devices owned by an entity, such as the transferor or the transferee, are managed by a cloud portal. However, for any given transfer of ownership of a device from a transferor to a transferee, a first possible situation (i.e., Use Case 1) is that the devices owned by the transferor and the device owned by the transferee are both managed by the same cloud portal (i.e., the first cloud portal). In this first possible situation, the ownership of the device will change from the transferor to the transferee, but the management of the device will remain with the same cloud portal (i.e., the first cloud portal) before and after the transfer. However, a second possible situation (i.e., Use Case 2) is that the devices owned by the transferor are managed by the first cloud portal and the device owned by the transferee are managed by a second cloud portal. In this second possible situation, the ownership of the device will change from the transferor to the transferee, while the management of the device will change from the first (source) cloud portal before the transfer to a second (destination) cloud portal after the transfer. The generation of the ephemeral device transfer token for a device is discussed below for each of the two Use Cases.

Depending upon the Use Case, some portion of the following asymmetric key-pairs may be used in the process of generating an ephemeral device transfer token for a given device and/or the process of verifying the ephemeral device transfer token for a given device:
(1) transferor identity public/private key-pair
(2) transferee identity public/private key-pair
(3) ephemeral device transfer public/private key-pair
(4) Cloud Portal 1 identity public/private key-pair (Cloud Portal 1 is the cloud portal managing devices owned by the transferor and may be referred to as the "source cloud portal." However, Cloud Portal 1 may also manage the devices owned by the transferee. When Cloud Portal 1 manages device owned by both the transferor and the transferee, the distinction between a "source cloud portal" and a "destination cloud portal" is irrelevant.)
(5) Cloud Portal 2 identity public/private key-pair (In some embodiments, Cloud Portal 2 is the cloud portal managing devices owned by the transferee and may be referred to as the "destination cloud." The Cloud Portal 2 identity public/private key-pair is used when different cloud portals manage the devices owned by the transferor and transferee.)

The following two use cases highlight differences in the method or operations for generating an ephemeral device transfer token for a given device and/or the process of verifying the ephemeral device transfer token. However, the calculation of the ephemeral device transfer private/public key-pair is performed in the same way whether or not the management of the device will change from the first (source) cloud portal to a second (destination) cloud portal.

Use Case 1—Transferor is Transferring Ownership of a Device being Managed by a First Cloud to a Transferee for Management in the First Cloud Transferor/Source Cloud Portal Computes an Ephemeral Device Transfer Token for Each Device For each device being transferred, the transferor or source cloud portal may compute the authorization codes (i.e., code 1, code 2, code 3), which are subsequently used to compute an ephemeral device transfer token, using an Elliptic-Curve Diffie-Hellman (ECDH) key agreement protocol and the agree-upon ECC-Curve identity/parameters as follows:

code 1=ECDH(transferor identity private key,Cloud Portal 1 identity public key)

code 2=ECDH(ephemeral device transfer private key,Cloud Portal 1 identity public key)

code 3=ECDH(ephemeral device transfer private key,transferee identity public key It should be noted that, while the transferor or the source cloud portal may know or access the transferor identity private key and may generate the ephemeral device transfer private key (or the public/private key-pair), the transferor or source cloud portal must also be informed of the identity of the transferee and the destination cloud portal. Once informed of the identity of the transferee and the destination cloud portal, the transferor or the source cloud portal may freely obtain the public key of the transferee and the public key of the destination cloud portal for use in the generation of the authorization codes. With these two public keys included in the authorization codes that are used to generate the ephemeral device transfer token, the resulting ephemeral device transfer token will only be valid to support and transfer of ownership of the identified device to the transferee for management by the destination cloud portal.

The three authorization codes are selected to provide assurance that the identified device is currently owned by the transferor, the identified device is to be transferred to the destination cloud portal for management, and ownership of the identified device is to be transferred to the transferee. More specifically, code 1 provides attestation that the device is owned by the transferor, code 2 provides attestation that the device is to be transferred to Cloud Portal 1, and code 3 provides attestation that the device is being transferred to the transferee. If any other ownership transfer is attempted, the ephemeral device transfer token will not be verified and the ownership will not be transferred.

Code 1 is the output of the ECDH function having input including the transferor identity private key and the Cloud Portal 1 identity public key. The transferor identity private key is used to assure that the device is owned by the transferor, since only the transferor or the source cloud portal has knowledge of the transferor identity private key. Accordingly, the transferee or destination cloud portal will verify that the device ownership transfer is coming from the transferor. The Cloud Portal 1 identity public key is used because the device is being transferred to Cloud Portal 1 and because the ECDH function uses two keys—one private key and one public key. The transferor or source cloud portal will know the identity of the destination cloud portal and can easily obtain the public key of the destination cloud portal (which, in this Use Case, is Cloud Portal 1).

Code 2 is the output of the ECDH function having input including the ephemeral device transfer private key and the Cloud Portal 1 public key. The ephemeral device transfer private key is used because only the transferor should know the device attributes to compute the ephemeral device transfer private key at the time it is being created and only the transferor will know the ephemeral device transfer private key at the time of computation. The Cloud Portal 1 public key is used because the device is being transferred to Cloud Portal 1 and only Cloud Portal 1 will have access to its private key required to verify the ephemeral device transfer token.

Code 3 is the output of the ECDH function having input including the ephemeral transfer private key and the transferee identity public key. The ephemeral device transfer private key is used because only the transferor should know the device attributes to compute the ephemeral device transfer private key at the time it is being created and only the transferor will know the ephemeral device transfer private key at the time of computation. The transferee identity public key is used because it ties the transfer to only the transferee since only the transferee or the destination cloud portal will have possession of the transferee's private key. This assures that only the transferee or destination cloud portal will be able to verify the ephemeral device transfer token, since only the transferee or the destination cloud portal will have access to the transferee's private key.

An ephemeral device transfer token may then be computed for each device for which ownership is being transferred as follows:

ephemeral device transfer token=KDF(code 1,code 2,code 3)

The ephemeral device transfer token may be included with the transfer information provided for each device being transferred. The ephemeral device transfer token will be valid for a specific predefined time period, because the ECC private seed used in the ECDH function is calculated using a timestamp (i.e., ECC private seed=KDF (device attributes, PIN, timestamp)). For example, the timestamp may be a numerical representation of the current date without any indication of hours, minute or seconds, such that any timestamp captured on a given day will have the same value. Other timestamp representations may also be used.

Cloud Portal Verifies the Ephemeral Device Transfer Token for Each Device

The cloud portal computes authorization codes, which are subsequently used to compute a verification token, as follows:

code 1=ECDH(transferor identity public key,Cloud Portal 1 identity private key)

code 2=ECDH(ephemeral device transfer public key, Cloud Portal 1 identity private key)

code 3=ECDH(ephemeral device transfer public key, transferee identity private key)

Code 1 is the output of the ECDH function having input including the transferor identity public key and the Cloud Portal 1 identity private key. Note that these two keys are the opposites of the two keys used in generating code 1 for the ephemeral device transfer token. The transferor identity public key is used to assure that the device is currently owned by the transferor and that the transferor initiated the ownership transfer. The Cloud Portal 1 identity private key is used because the device is being transferred to Cloud Portal 1, thereby assuring that the device can only be transferred to Cloud Portal 1.

Code 2 is the output of the ECDH function having input including the ephemeral transfer device public key and the Cloud Portal 1 identity private key. The ephemeral transfer device public key is used to assure that the device can be transferred, and the Cloud Portal 1 identity private key is used to assure that the device is being transferred to Cloud Portal 1.

Code 3 is the output of the ECDH function having input including the ephemeral transfer public key and the transferee identity private key. The ephemeral transfer device public key is used to assure that the device can be transferred, and the transferee identity private key is used to assure that the device is being transferred to the transferee.

The three authorization codes are then input to the key derivation function to generate a verification token for the device, as follows:

verification token=KDF(code 1,code 2,code 3)

The cloud portal then compares the verification token that was computed by the cloud portal to the ephemeral device transfer token received with the transfer information from the transferee in association with the device attribute, such as a device identifier. If the value of the computed ephemeral device transfer token is equal to the value of the received ephemeral device transfer token, then the cloud portal will modify its device ownership records to reflect the transfer of ownership over the device. Specifically, the cloud portal will record the fact that the device is now owned by the transferee (which also means that the device is no longer owned by the transferor).

If more than one cloud is involved in the transfer of ownership, then the transferor may generate an additional authorization code(s) for used in calculating the ephemeral device transfer token. For example, the additional authorization code(s) may be calculated as follows:

code N=ECDH(epheremal transfer private key,Cloud N identity public key)

Each of the authorization codes is then used in the key derivation function to calculate an ephemeral device transfer token as follows:

ephemeral device transfer token=KDF(code 1,code 2,code 3,code N)

An example of a transferor in a first cloud (i.e., a source cloud) transferring ownership of a device to a transferee in a second cloud (i.e., a destination cloud) is provided in Use Case 2, below. While the term "source cloud" is used to refer to a cloud from which device ownership is being transferred, it should be understood that the same cloud may also be referred to as a "destination cloud" in other instances, such as when ownership of the same or different device is being transferred to the given cloud. Accordingly, the terms "source cloud" and "destination cloud" may refer to a particular transfer of ownership over one or more device at any given point in time.

Use Case 2—Transferor is Transferring Ownership of a Device being Managed by a First Cloud (Source Cloud) to a Transferee for Management in a Second Cloud (Destination Cloud)

Transferor Computes an Ephemeral Device Transfer Token for Each Device

The Generated one-time transfer token will be valid for the specific predefined time period.

code 1=ECDH(transferor identity private key,Cloud Portal 2 identity public key)

code 2=ECDH(ephemeral device transfer private key,Cloud Portal 2 identity public key)

code 3=ECDH(ephemeral device transfer private
  key,transferee identity public key)

code 4=ECDH(Cloud Portal 1 identity private key,
  Cloud Portal 2 identity public key The four authorization codes are selected to provide assurance that the identified device is currently owned by the transferor, the identified device is to be transferred to the destination cloud portal for management, ownership of the identified device is to be transferred to the transferee, and management of the device is being changed to the destination cloud portal. More specifically, code 1 provides attestation that the device is owned by the transferor and can only be transferred for management in Cloud Portal 2, code 2 provides attestation that the device is to be transferred to Cloud Portal 2, code 3 provides attestation that the device is being transferred to the transferee, and Code 4 provides attestation that the device being transferred is in Cloud Portal 1 and can only be transferred to an organization in Cloud Portal 2. If any other ownership transfer is attempted, the ephemeral device transfer token will not be verified and the ownership will not be transferred.

Code 1 is the output of the ECDH function having input including the transferor identity private key and the Cloud Portal 2 identity public key. The transferor identity private key is used to assure that the device is owned by the transferor, since only the transferor or the source cloud portal has knowledge of the transferor identity private key. Accordingly, the transferee or destination cloud portal will verify that the device ownership transfer is coming from the transferor. The Cloud Portal 2 identity public key is used because the device is being transferred to Cloud Portal 2 and because the ECDH function uses two keys—one private key and one public key. The transferor or source cloud portal will know the identity of the destination cloud portal and can easily obtain the public key of the destination cloud portal (which, in this case, is Cloud Portal 2).

Code 2 is the output of the ECDH function having input including the ephemeral device transfer private key and the Cloud Portal 2 identity public key. The ephemeral device transfer private key is used because only the transferor should know the device attributes to compute the ephemeral device transfer private key at the time it is being created and only the transferor will know the ephemeral device transfer private key at the time of computation. The Cloud Portal 2 public key is used because the device is being transferred to Cloud Portal 2 and because only Cloud Portal 2 should have access to its private key.

Code 3 is the output of the ECDH function having input including the ephemeral transfer private key and the transferee identity public key. The ephemeral device transfer private key is used because only the transferor should know the device attributes to compute the ephemeral device transfer private key at the time it is being created and only the transferor will know the ephemeral device transfer private key at the time of computation. The transferee identity public key is used because it ties the transfer to only the transferee since only the transferee or the destination cloud portal will have possession of the transferee's private key. This assures that only the transferee or destination cloud portal will be able to verify the ephemeral device transfer token, since only the transferee or the destination cloud portal will have access to the transferee's private key.

Code 4 is the output of the ECDH function having input including the Cloud Portal 1 identity private key and the Cloud Portal 2 identity public key. The Cloud Portal 1 identity private key is used to assure the device is owned by Cloud Portal 1 and no other cloud, and the Cloud Portal 2 identity public key is used to assure the device can only be transferred to Cloud Portal 2 and no other cloud.

An ephemeral device transfer token may then be computed for each device for which ownership is being transferred as follows:

ephemeral device transfer token=KDF(code 1,code
  2,code 3,code 4)

The ephemeral device transfer token will be valid for the specific predefined time period. A separate ephemeral device transfer token is computed for each device and may be included with the transfer information provided for each device.

Cloud Portal Verifies the Ephemeral Device
Transfer Token for Each Device

The destination cloud portal (Cloud Portal 2) computes authorization codes, which are subsequently used to compute a verification token, as follows:

code 1=ECDH(transferor identity public key,Cloud
  Portal 2 identity private key)

code 2=ECDH(ephemeral device transfer public key,
  Cloud Portal 2 identity private key)

code 3=ECDH(ephemeral device transfer public key,
  transferee identity private key)

code 4=ECDH(Cloud Portal 1 identity public key,
  Cloud Portal 2 identity private key)

Code 1 is the output of the ECDH function having input including the transferor identity public key and the Cloud Portal 2 identity private key. Note that these two keys are the opposites of the two keys used in generating code 1 for the ephemeral device transfer token. The transferor identity public key is used to assure that the device is currently owned by the transferor and that the transferor initiated the ownership transfer. The Cloud Portal 2 identity private key is used because the device is being transferred to Cloud Portal 2, thereby assuring that the device can only be transferred to Cloud Portal 2.

Code 2 is the output of the ECDH function having input including the ephemeral transfer device public key and the Cloud Portal 2 identity private key. The ephemeral transfer device public key is used to assure that the device can be transferred, and the Cloud Portal 2 identity private key is used to assure that the device is being transferred to Cloud Portal 2.

Code 3 is the output of the ECDH function having input including the ephemeral transfer public key and the transferee identity private key. The ephemeral transfer device public key is used to assure that the device can be transferred, and the transferee identity private key is used to assure that the device is being transferred to the transferee.

Code 4 is the output of the ECDH function having input including the Cloud Portal 1 identity public key and the Cloud Portal 2 identity private key. The Cloud Portal 1 identity public key is used to assure the device is owned by Cloud Portal 1 and no other cloud, and the Cloud Portal 2 identity private key is used to assure the device can only be transferred to Cloud Portal 2 and no other cloud.

The four authorization codes are then input to the key derivation function to generate a verification token for the device, as follows:

verification token=KDF(code 1,code 2,code 3,code 4)

The cloud portal then compares the computed verification token (i.e., computed by the destination cloud portal for purposes of verification) to the ephemeral device transfer token that the destination cloud portal received from the transferee as part of the device transfer information. If the value of the computed verification token is equal to the value of the received ephemeral device transfer token, then the cloud portal will modify its device ownership records to reflect the transfer of ownership over the device. Specifically, the destination cloud portal will modify its device ownership records to reflect that the device is now owned by the transferee (which also means that the device is no longer owned by the transferor). Furthermore, the destination cloud portal may send a secure message to the source cloud portal instructing the source cloud portal to modify its device ownership records to reflect that the device is no longer owned by the transferor.

Some of the embodiments have been described as a computer program product comprising a non-volatile computer readable medium and non-transitory program instructions embodied therein, wherein the program instructions are configured to be executable by a processor to cause the processor to perform various operations. However, some embodiments may include a method including steps that are of the same scope as the operations, such as may be performed with or without program instructions. Still further, some embodiments may include an apparatus that performs the method or that includes the computer readable medium with non-transitory program instructions and a processor that performs the various operations.

FIG. 1 is a diagram of multiple computing systems 10, 20, 30 that may use cloud portals 40, 50 to manage devices owned by each computing system. The computing systems 10, 20, 30 and the cloud portals 40, 50 may be in communication over a network 69. The three computing systems 10, 20, 30 may each belong to a separate entity (i.e., Entity 1, Entity 2 and Entity 3), respectively. The cloud portals 40, 50 each manage one or more devices 62-68 in a cloud platform 60 on behalf of one or more of the computing systems 10, 20, 30. Each cloud portal 40, 50 may maintain their own device ownership records 42, 52, respectively, in order to keep track of which computing system is the current owner of each device that the cloud portal is managing.

Some embodiments are directed at transferring ownership of one or more of the devices 62-68 from one computing system to another computing system. As illustrated here, the computing system 10 of Entity 1 may securely transfer ownership of one or more devices that are currently owned by the Entity 1 computing system 10 to the Entity 2 computing system 20. At some other point in time, the computing system 20 of Entity 2 may securely transfer ownership of the same or different set of one or more devices that are currently owned by the Entity 2 computing system 20 to the Entity 3 computing system 30. For that matter, any computing system that has ownership of a device within the cloud platform 60 may securely transfer its ownership to any other computing system at any time. However, for any one transfer of ownership of one or more device, there will be a transferor, a transferee, a source cloud portal and a destination cloud portal, where the source and destination cloud portals may be the same cloud portal or two different cloud portals.

Figure 2:
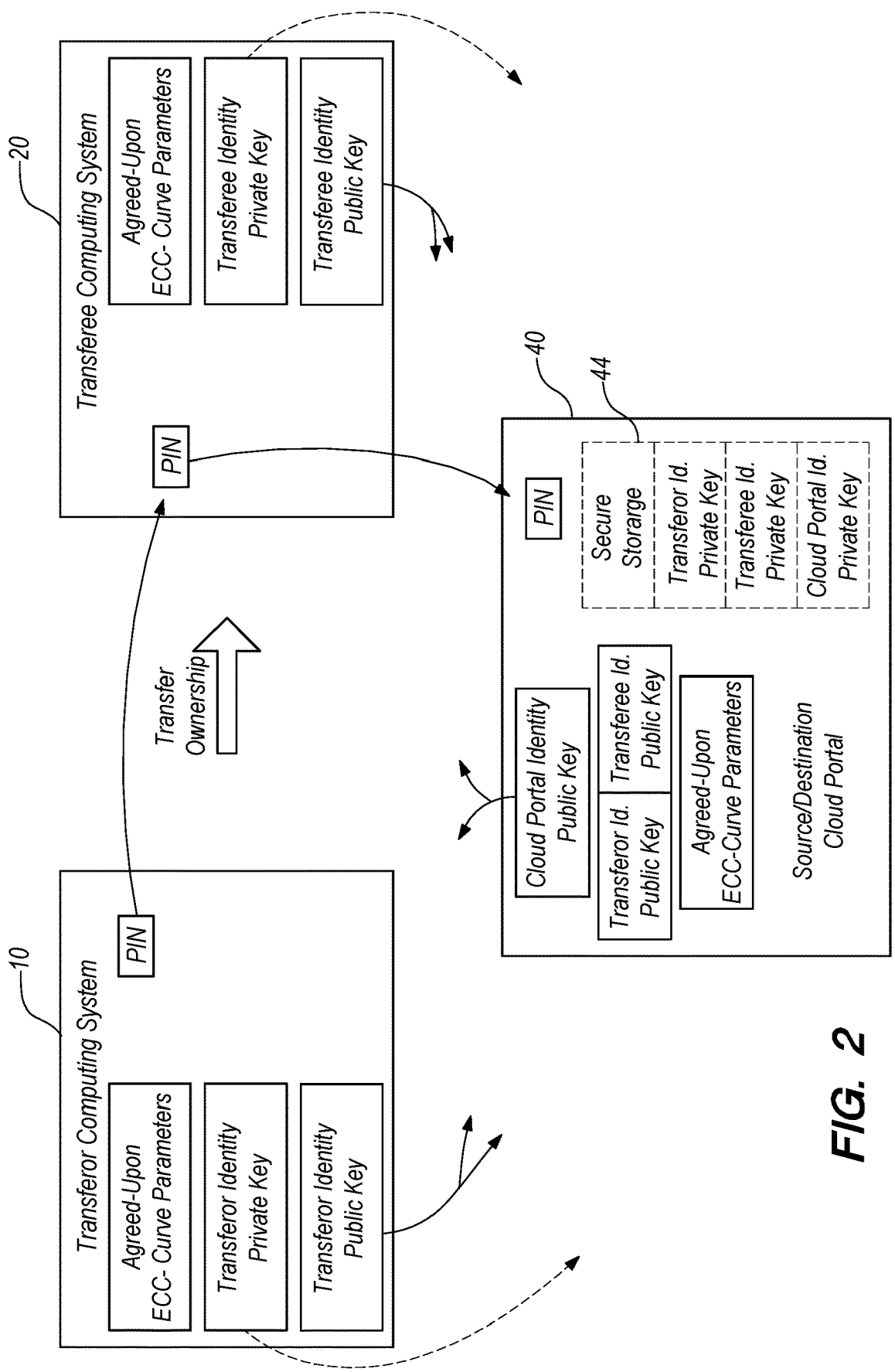
FIG. 2 is a diagram illustrating transferor, transferee and cloud portal computing systems exchanging public keys and a shared secret number, such as a personal identification number (PIN).

FIG. 2 is a diagram illustrating a transferor computing system 10, a transferee computing system 20 and a cloud portal computing system 40 exchanging public keys and a shared secret number, such as a personal identification number (PIN). The transferor may initiate the transfer of ownership of one or more of the devices that it current owns. In the illustrated transfer, the transferor computing system 10 is taking steps to transfer ownership of one or more devices to the transferee computing system 20. Furthermore, the one or more devices for which ownership is to be transferred are managed by the cloud portal 40 on behalf of the transferor prior to the transfer and will still be managed by the cloud portal 40 after the transfer on behalf of the transferee. Accordingly, only three entities are involved in the secure transfer of ownership.

FIG. 2 illustrates some preliminary or extraneous operations that enable some embodiments to be performed. For example, the arrows illustrate that the identity public key of each entity is made publicly available and/or is shared with each other entity that is a party to the transfer. Accordingly, each entity 10, 20, 40 has access to each other entity's identity public key. However, consistent with some embodiments, the cloud portal 40 may further have access to the transferor identity private key and/or the transferee identity private key. The cloud portal 40 may have access to the identity private key of the transferor by virtue of managing one or more device for the transferor, such that the cloud portal may service as a secure agent of the transferor. Similarly, the cloud portal 40 may have access to the identity private key of the transferee by virtue of managing one or more device for the transferee, such that the cloud portal may service as a secure agent of the transferee. In some embodiments, the cloud portal 40 might actually generate the transferor identity public/private key-pair and bind that key-pair to the transferor and/or generate the transferee identity public/private key-pair and bind that key-pair to the transferee. In any case, the cloud portal 40 may store its own identity private key and any identity private key of another entity in a secure storage device 44.

Each entity 10, 20, 40 has also been provided with a set of agreed-upon ECC-curve parameters for use in various ECDH functions. While some embodiments do not require the transferee computing system 20 to perform ECDH functions, it is still practical for the transferee computing system 20 to have the set of agreed-upon ECC-curve parameters should the transferor ever need to perform ECDH functions, such as if the computing system 20 should later be a transferor in a different ownership transfer.

The PIN or shared secret number is illustrated as being selected by the transferor computing system 10 and sent to the transferee computing system 20 for forwarding to the cloud portal 40. However, embodiments are compatible with the PIN or shared secret number being selected in any manner so long as it is shared among the entities that will generate an ECC private seed, either as an operation toward generating an ephemeral device transfer token or as an operation toward generating a verification token. While not illustrated, embodiments may cause each entity to use the same KDF for ECC private seed generation, the same CSPRNG for ephemeral device transfer private key generation, and the same KDF for ephemeral device transfer token generation and verification token generation.

Figure 3A:
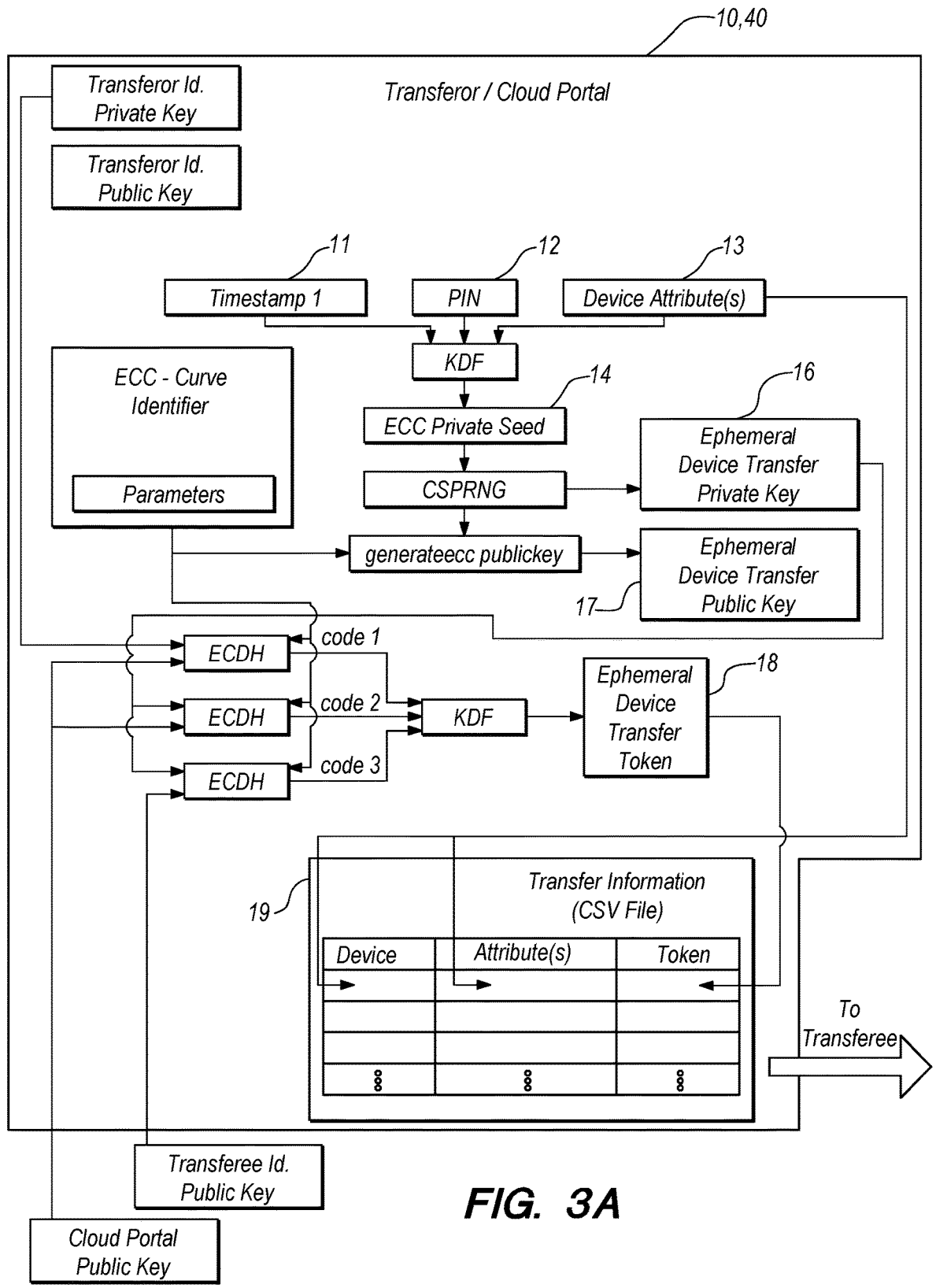
FIG. 3A is a diagram of the transferor, or cloud portal acting on behalf of the transferor, generating one or more ephemeral device transfer token.

FIG. 3A is a diagram of operations performed by the transferor 10 and/or the cloud portal 40. The source cloud portal 40 may be acting on behalf of the transferor 10 to manage one or more devices owned by the transferor 10 and may also perform some or all of the operations for generating one or more ephemeral device transfer tokens corresponding to one or more devices the source cloud portal 40 is managing for the transferor 10.

The transferor 10 initially identifies one or more devices under management for which ownership of the device is to be transferred to an identified transferee. For each device for which ownership is being transferred, an ephemeral device transfer token 18 for the device may be generating by: (1) obtaining a first elliptic-curve cryptography private seed 14 as the output of a key derivation function having input including a first timestamp 11, a shared secret number ("PIN") 12, and one or more device attribute 13 of the device; (2) obtaining a first ephemeral device transfer private key 16 as the output of a cryptographically secure pseudo-random number generator (CSPRNG) using the first elliptic-curve cryptography private seed 14 as input; (3) calculating a first authorization code as the output of the elliptic-curve Diffie-Hellman function having input from a transferor identity private key and a cloud portal identity public key; (4) calculating a second authorization code as the output of the elliptic-curve Diffie-Hellman function having input from the first ephemeral device transfer private key and the cloud portal identity public key; and (5) calculating a third authorization code as the output of the elliptic-curve Diffie-Hellman function having input from the first ephemeral device transfer private key and a transferee public key, wherein the ephemeral device transfer token 18 for the device is the output of the key derivation function having input including the first authorization code, the second authorization code, and the third authorization code.

The operations may further comprise forming a transfer information file 19 containing, for each device, the device attribute(s) 13 and the ephemeral device transfer token 18. After generating an ephemeral device transfer token 18 for each device being transferred, the transfer information file 19 may be provide to the transferor for delivery to the transferee.

The transferor 10 and/or cloud portal 40 are shown further computing an ephemeral device transfer public key 17, but this is optional in embodiments where the ephemeral device transfer public key 17 is not utilized in generation of the ephemeral device transfer token 18.

Figure 3B:
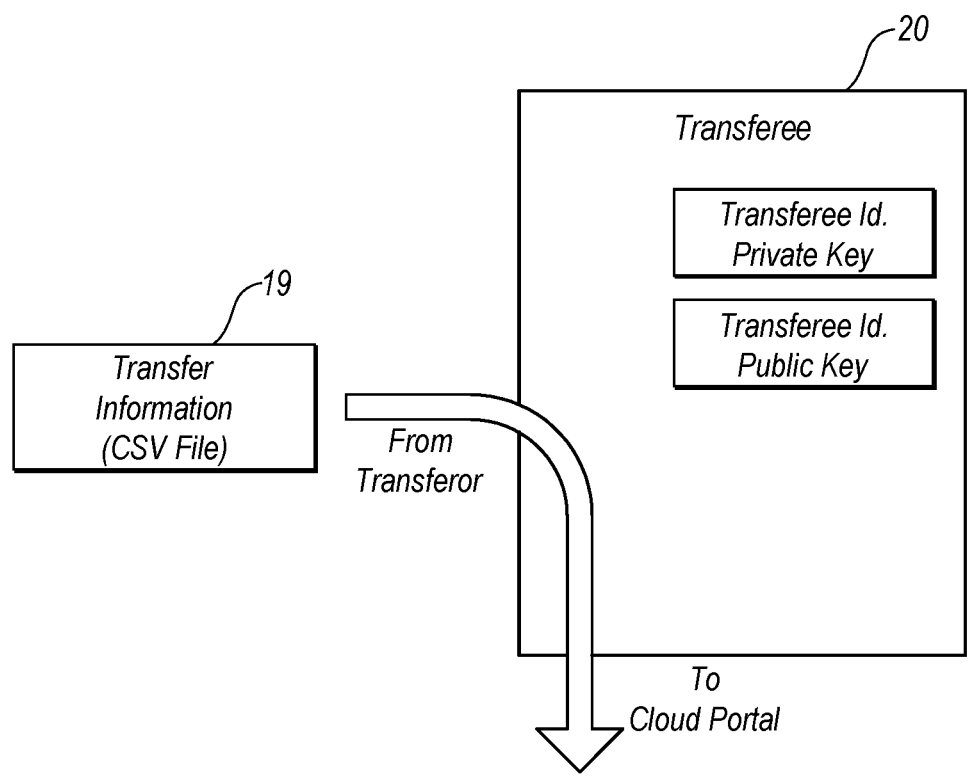
FIG. 3B is a diagram of a transferee receiving transfer information from the transferor and providing the transfer information to the cloud portal.
Figure 3C:
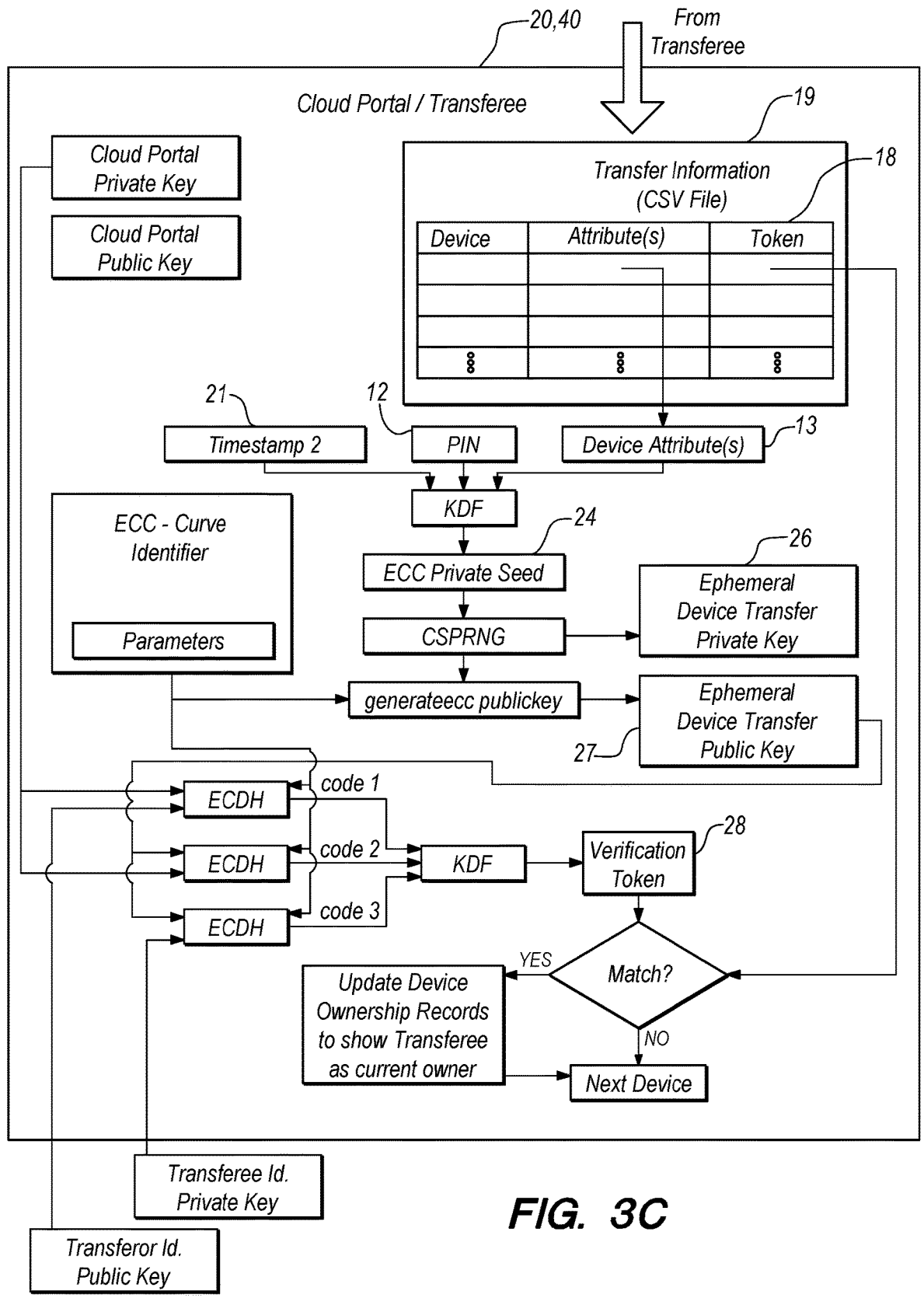
FIG. 3C is a diagram of the cloud portal generating a verification token for the purpose of verifying whether the ephemeral device transfer token received from the transferee is valid.

FIG. 3B is a diagram of the transferee 20 receiving the transfer information 19 from the transferor and providing the transfer information 19 to the cloud portal 40 in FIG. 3C. Accordingly, the transferee is requesting that the cloud portal 40 verify the transfer of ownership and, if verified, accept management of the one or more device identified in the transfer information.

FIG. 3C is a diagram of operations performed by the destination cloud portal 40 and/or the transferee 20. Before modifying ownership records to reflect any transfer of ownership, the ephemeral device transfer token for each device identified in the transfer information file 19 must be verified. For each of the plurality of devices, verification may include: (1) obtaining a second elliptic-curve cryptography private seed 24 as the output of the key derivation function having input including a second timestamp 21, the shared secret number 12, and the one or more device attribute 13 of the device received in the file 19; (2) obtaining a second ephemeral device transfer private key 26 as the output of the cryptographically secure pseudo-random number generator (CSPRNG) using the second elliptic-curve cryptography private seed 24 as input; (3) obtaining a second ephemeral device transfer public key 27 as the output of the public key generator using the second ephemeral device transfer private key 26 and the predetermined elliptic-curve parameters; (4) calculating a first authorization code as the output of the elliptic-curve Diffie-Hellman function having input from a transferor identity public key and a cloud portal identity private key; (5) calculating a second authorization code as the output of the elliptic-curve Diffie-Hellman function having input from the second ephemeral device transfer public key and the cloud portal identity private key; and (6) calculating a third authorization code as the output of the elliptic-curve Diffie-Hellman function having input from the second ephemeral device transfer public key and a transferee private key, wherein the verification token 28 for the device is the output of a key derivation function having input including the first authorization code, the second authorization code, and the third authorization code.

The verification token 28 calculated for each device is then compared with the ephemeral device transfer token 18 received in the transfer information 19 for the purpose of verifying whether the ephemeral device transfer token 18 is valid. If the verification token matches the ephemeral device transfer token, then the cloud portal 40 will update its device ownership records to show the transferee as the current (new) owner of the device. This method is repeated for each device.

Figure 4:
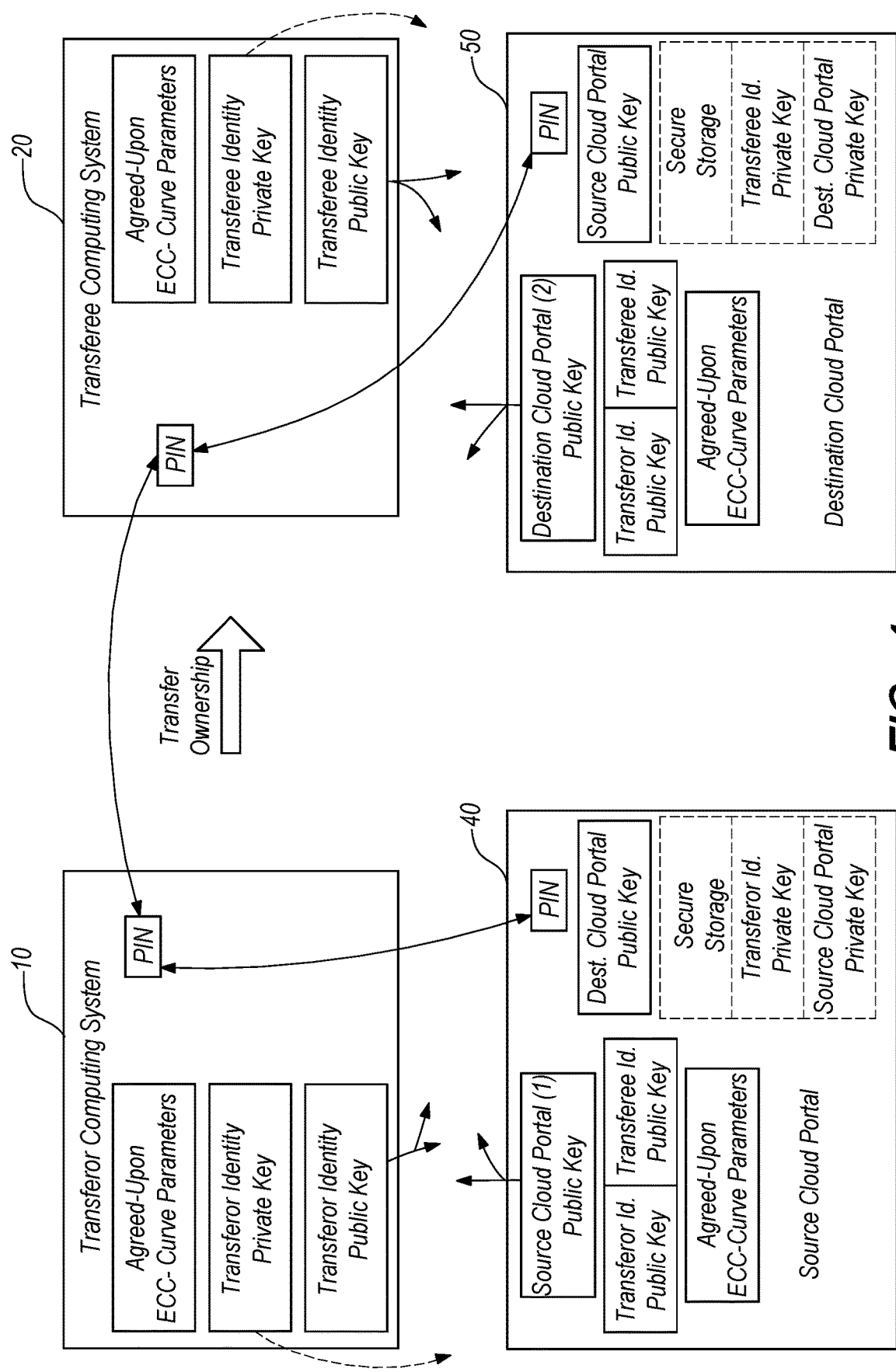
FIG. 4 is a diagram illustrating transferor, transferee, source cloud portal and destination cloud portal computing systems exchanging public keys and a shared secret number, such as a personal identification number (PIN).

FIG. 4 is a diagram illustrating the computing systems of the transferor 10, transferee 20, source cloud portal 40 and destination cloud portal 50 exchanging public keys and a shared secret number, such as a personal identification number (PIN). Optionally, the transferor 10 may share its transferor identity private key with the source cloud portal 40, which manages devices on behalf of the transferor 10. Separately, the transferee 20 may share its transferee identity private key with the destination cloud portal 50, which manages devices on behalf of the transferee 20. Since the transferor and transferee have different cloud portals, FIG. 4 illustrates the same situation as in Use Case 2 described above. Use Case 2 is similar to Use Case 1 with a few differences. The differences are discussed above, and will be highlighted in FIGS. 5A-5C.

Figure 5A:
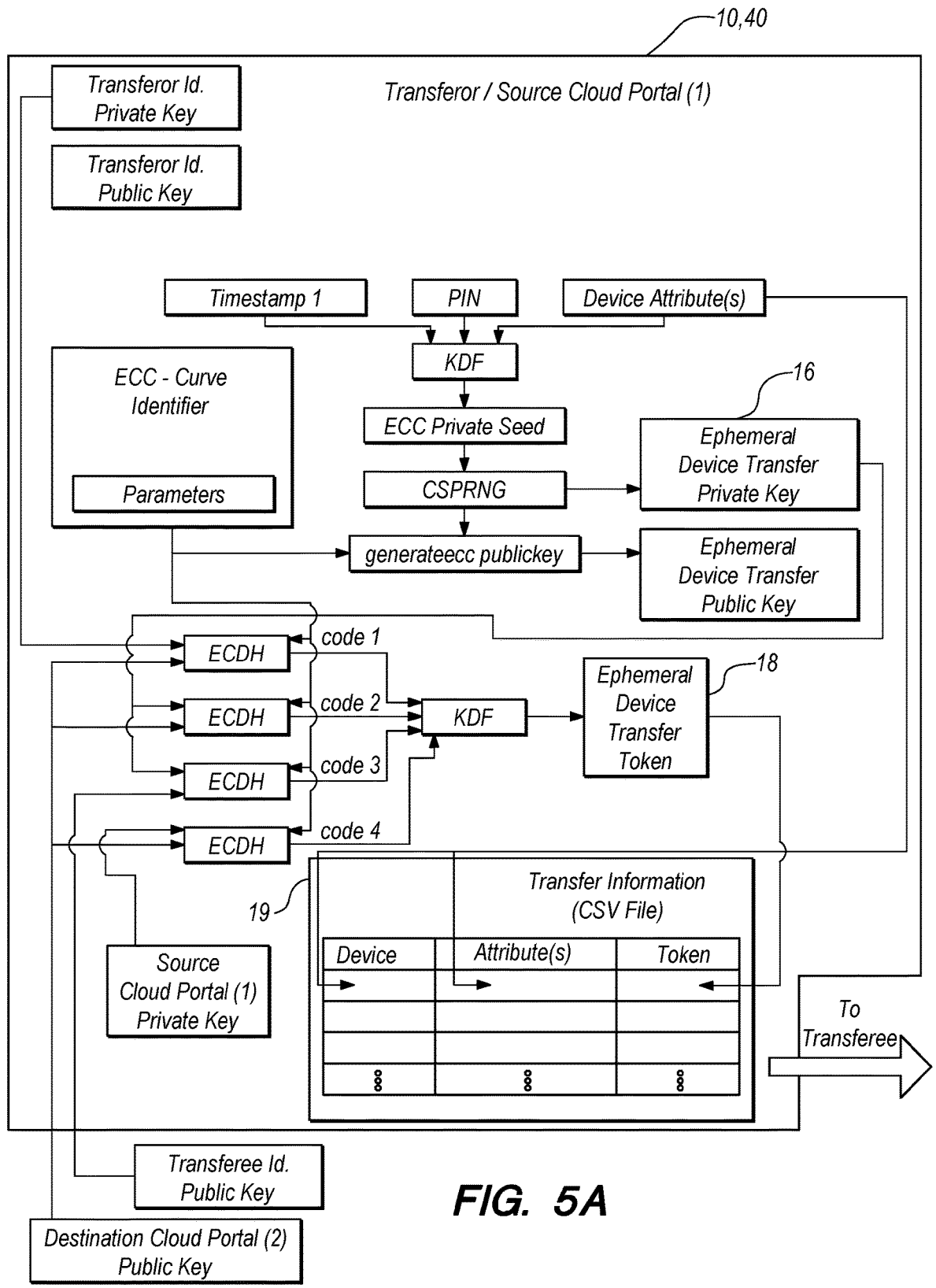
FIG. 5A is a diagram of the transferor and/or source cloud portal generating one or more ephemeral device transfer token.

FIG. 5A is a diagram of the transferor 10 and/or source cloud portal 40 generating one or more ephemeral device transfer token 18. Each ephemeral device transfer token 18 is generated in a substantially similar manner as described in FIG. 3A for Use Case 1, except for the number and content of the authorization codes.

After generating the ephemeral device transfer private key 16 as previously described, the operations further include: (1) calculating a first authorization code as the output of the elliptic-curve Diffie-Hellman function having input from a transferor identity private key and the destination cloud portal (Cloud Portal 2) public key; (2) calculating a second authorization code as the output of the elliptic-curve Diffie-Hellman function having input from the first ephemeral device transfer private key and the destination cloud portal (Cloud Portal 2) public key; (3) calculating a third authorization code as the output of the elliptic-curve Diffie-Hellman function having input from the first ephemeral device transfer private key and a transferee identity public key; and (4) calculating a fourth authorization code as the output of the elliptic-curve Diffie-Hellman function having input from the source cloud portal (Cloud Portal 1) identity private key and the destination cloud portal (Cloud Portal 2) identity public key. Subsequently, the ephemeral device transfer token 18 for the device is the output of the key derivation function having input including the first authorization code, the second authorization code, the third authorization code, and the fourth authorization code. This method is repeated for each device for which ownership is being transferred, and a transfer information file 19 is provided to the transferee.

Figure 5B:
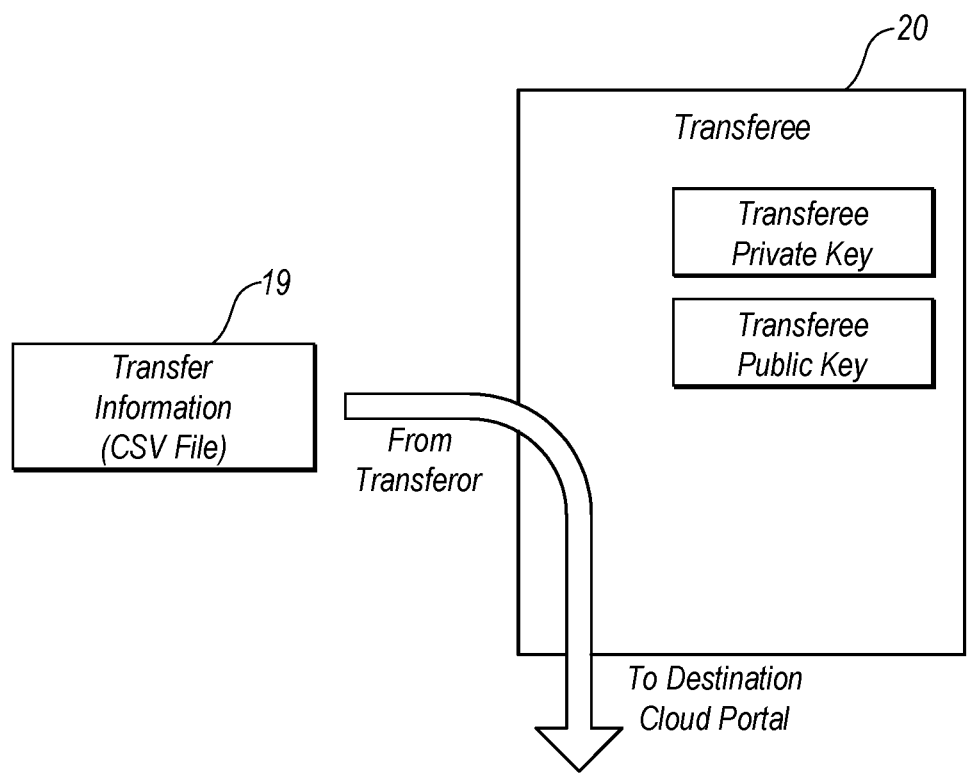
FIG. 5B is a diagram of a transferee receiving transfer information from the transferor and providing the transfer information to the destination cloud portal.
Figure 5C:
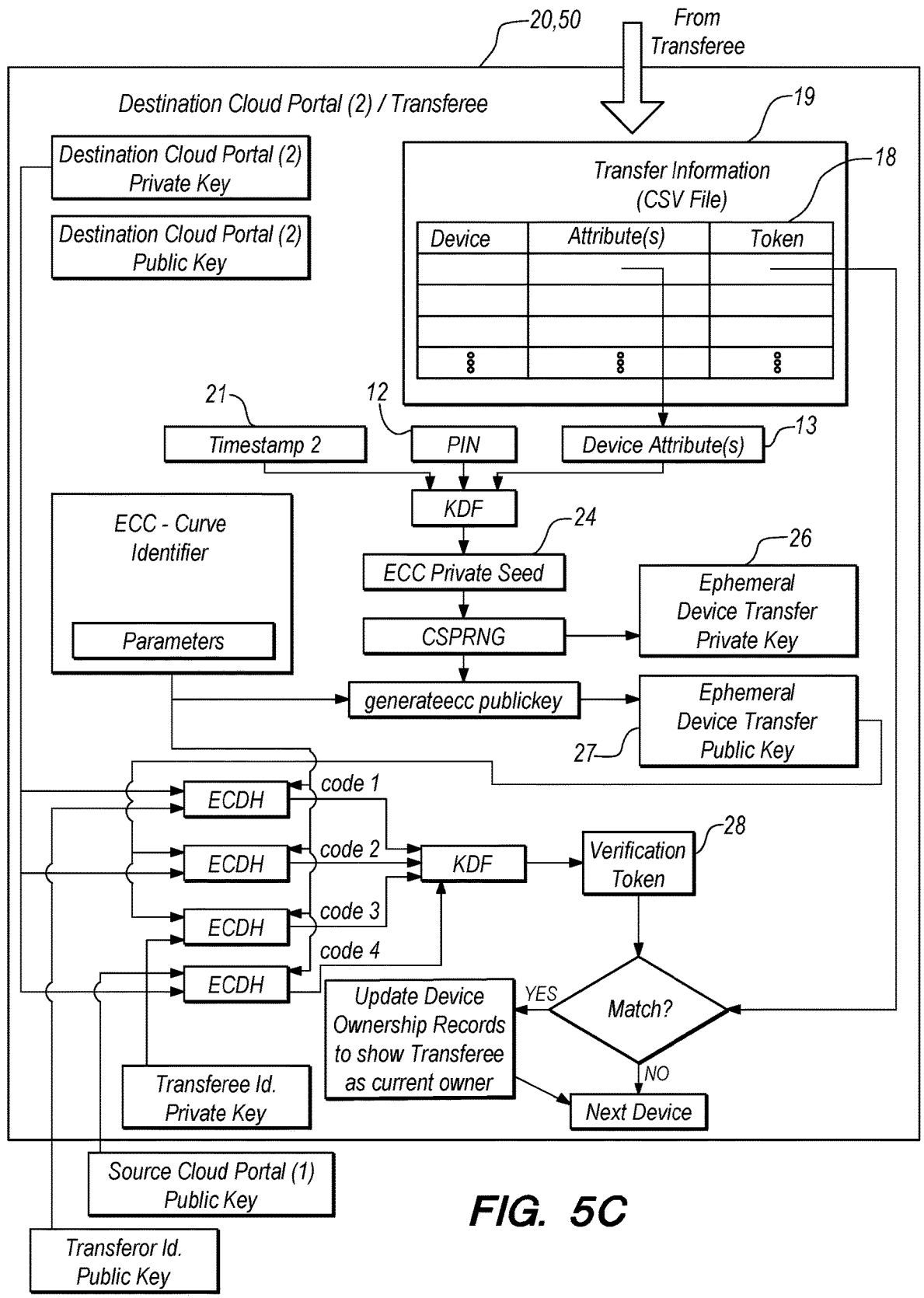
FIG. 5C is a diagram of the transferee and/or destination cloud portal generating a verification token for the purpose of verifying whether the ephemeral device transfer token received from the transferee is valid.

FIG. 5B is a diagram of the transferee 20 receiving the transfer information 19 from the transferor and providing the transfer information 19 to the destination cloud portal 50 in FIG. 5C. Accordingly, the transferee is requesting that the cloud portal 50 verify the transfer of ownership and, if verified, accept management of the one or more device identified in the transfer information.

FIG. 5C is a diagram of the destination cloud portal 50 and/or the transferee 20 generating a verification token 28 for the purpose of verifying whether the ephemeral device transfer token 18 received from the transferee is valid. Each verification token 28 is generated in a substantially similar manner as described in FIG. 3C for Use Case 1, except for the number and content of the authorization codes.

For each of the plurality of devices, verification may include: (1) obtaining a second elliptic-curve cryptography private seed 24 as the output of the key derivation function having input including a second timestamp 21, the shared secret number 12, and the one or more device attribute 13 of the device received in the file 19; (2) obtaining a second ephemeral device transfer private key 26 as the output of the cryptographically secure pseudo-random number generator (CSPRNG) using the second elliptic-curve cryptography private seed 24 as input; (3) obtaining a second ephemeral device transfer public key 27 as the output of the public key generator using the second ephemeral device transfer private key 26 and the predetermined elliptic-curve parameters; (4) calculating a first authorization code as the output of the elliptic-curve Diffie-Hellman function having input from a transferor identity public key and a destination cloud portal (Cloud 2) private key; (5) calculating a second authorization code as the output of the elliptic-curve Diffie-Hellman function having input from the second ephemeral device transfer public key and the destination cloud portal (Cloud Portal 2) private key; and (6) calculating a third authorization code as the output of the elliptic-curve Diffie-Hellman function having input from the second ephemeral device transfer public key and a transferee identity private key, and (7) calculating a fourth authorization code as the output of the elliptic-curve Diffie-Hellman function having input from the source cloud portal (Cloud Portal 1) identity public key and the destination cloud portal (Cloud Portal 2) identity private key. Subsequently, the ephemeral device transfer token 18 for the device is the output of the key derivation function having input including the first authorization code, the second authorization code, the third authorization code, and the fourth authorization code. This method is repeated for each device for which ownership is being transferred, and a transfer information file 19 is provided to the transferee.

The verification token 28 calculated for each device is then compared with the ephemeral device transfer token 18 received in the transfer information 19 for the purpose of verifying whether the ephemeral device transfer token 18 is valid. If the verification token matches the ephemeral device transfer token, then the cloud portal 50 will update its device ownership records to show the transferee as the current (new) owner of the device. This method is repeated for each device.

FIG. 6 is a diagram of a server 100 that may, without limitation, be included in the computing systems 10, 20, 30 or cloud portals 40, 50 to perform one or more of the disclosed operations. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the server 100 is able to communicate with other network devices over the network 69 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include secure device ownership transfer logic 146 that causes the processor to perform the operations of the computing system according to one or more embodiments.

The operating system 138 for the server 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Figure 7:
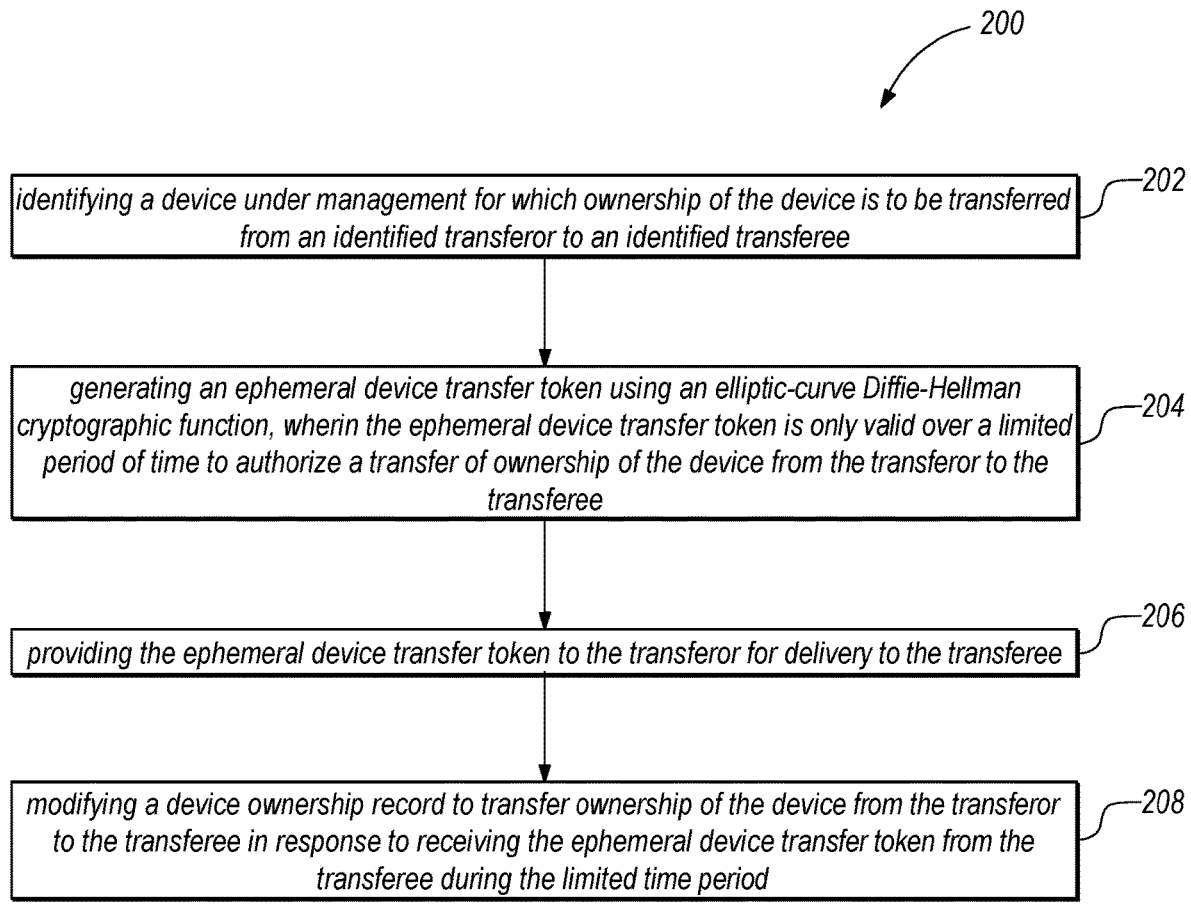
FIG. 7 is a flowchart of operations according to an embodiment.

FIG. 7 is a flowchart of operations 200. Operation 202 includes identifying a device under management for which ownership of the device is to be transferred from an identified transferor to an identified transferee. Operation 204 includes generating an ephemeral device transfer token using an elliptic-curve Diffie-Hellman cryptographic function, wherein the ephemeral device transfer token is only valid over a limited period of time to authorize a transfer of ownership of the device from the transferor to the transferee. Operation 206 includes providing the ephemeral device transfer token to the transferor for delivery to the transferee. Operation 208 includes modifying a device ownership record to transfer ownership of the device from the transferor to the transferee in response to receiving the ephemeral device transfer token from the transferee during the limited time period.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   identifying a device under management for which ownership of the device is to be transferred from an identified transferor to an identified transferee;
   generating an ephemeral device transfer token using an elliptic-curve Diffie-Hellman cryptographic function, wherein the ephemeral device transfer token is only valid over a limited period of time to authorize a transfer of ownership of the device from the transferor to the transferee;
   providing the ephemeral device transfer token to the transferor for delivery to the transferee; and
   modifying a device ownership record to transfer ownership of the device from the transferor to the transferee in response to receiving the ephemeral device transfer token from the transferee during the limited time period.

2. The computer program product of claim 1, the operations further comprising:
   permitting only the transferor to take an ownership action on the device prior to modifying the device ownership record; and
   permitting only the transferee to take the ownership action on the device subsequent to modifying the device ownership record.

3. The computer program product of claim 2, wherein the ownership action is activating the device for operation, logging in to the device, installing a software application on the device, and/or erasing data from the device.

4. The computer program product of claim 1, wherein the device under management is a server, switch, storage area network, and/or network attached storage.

5. The computer program product of claim 1, wherein the ephemeral device transfer token is generated using a first timestamp, a shared secret number, an attribute of the device, a transferor identity key, a transferee identity key, and a cloud portal identity key, the operations further comprising:
   generating a verification token using the elliptic-curve Diffie-Hellman cryptographic function, wherein the verification token is generated using a second timestamp, the shared secret number, the attribute of the device, the opposite key of the transferor identity key, the opposite of the transferee identity key, and the opposite of the cloud portal identity key, wherein the operation of modifying the device ownership record to transfer ownership of the device from the identified transferor to the identified transferee is performed only upon determining that the ephemeral device transfer token for the device received from the transferee is the same as the verification token.

6. The computer program product of claim 1, wherein the ephemeral device transfer token for the device is generating by:
   obtaining a first elliptic-curve cryptography private seed as the output of a key derivation function having input including a first timestamp, a shared secret number, and a device attribute of the device;
   obtaining a first ephemeral device transfer private key as the output of a cryptographically secure pseudo-random number generator using the first elliptic-curve cryptography private seed as input;
   calculating a first authorization code as the output of the elliptic-curve Diffie-Hellman function having input from a transferor identity private key and a cloud portal public key;
   calculating a second authorization code as the output of the elliptic-curve Diffie-Hellman function having input from the first ephemeral device transfer private key and the cloud portal identity public key;
   calculating a third authorization code as the output of the elliptic-curve Diffie-Hellman function having input from the first ephemeral device transfer private key and a transferee public key;
   wherein the ephemeral device transfer token for the device is the output of the key derivation function having input including the first authorization code, the second authorization code, and the third authorization code.

7. The computer program product of claim 6, wherein the operation of modifying the device ownership record to transfer ownership of the device from the identified transferor to the identified transferee is performed only upon verification of the ephemeral device transfer token for the device received from the transferee, wherein verification includes:
   obtaining a second elliptic-curve cryptography private seed as the output of the key derivation function having input including a second timestamp, the shared secret number, and the device attribute of the device;
   obtaining an ephemeral device transfer private key as the output of the cryptographically secure pseudo-random number generator using the elliptic-curve cryptography private seed as input;
   obtaining an ephemeral device transfer public key as the output of a public key generator using the ephemeral device transfer private key and predetermined elliptic-curve parameters;
   calculating a first authorization code as the output of the elliptic-curve Diffie-Hellman function having input from a transferor identity public key and a cloud portal identity private key;
   calculating a second authorization code as the output of the elliptic-curve Diffie-Hellman function having input from the ephemeral device transfer public key and the cloud portal identity private key;
   calculating a third authorization code as the output of the elliptic-curve Diffie-Hellman function having input from the ephemeral device transfer public key and a transferee private key;
   wherein the verification token for the device is the output of a key derivation function having input including the first authorization code, the second authorization code, and the third authorization code.

8. The computer program product of claim 7, wherein the ephemeral device transfer token for the device is received over a first communication medium and the shared secret number is received over a second communication medium that is different from the first communication medium, wherein the first and second communication mediums include email, instant messaging, text messaging, phone call, or shared cloud storage.

9. The computer program product of claim 7, wherein the first timestamp is captured at the time that the first elliptic-curve cryptography private seed is obtained, and wherein the second timestamp is captured at the time that the second elliptic-curve cryptography private seed is obtained.

10. The computer program product of claim 7, wherein the device attribute is a device Serial Number, device Model Number, device Media Access Control address, device memory Serial Number, Secure Digital card attribute, and/or Trusted Platform Module attribute.

11. A computer program product comprising a non-volatile computer readable medium and non-transitory program instructions embodied therein, the program instructions being configured to be executable by a processor to cause the processor to perform operations comprising:
  identifying a plurality of devices under management for which ownership of each device is to be transferred from an identified transferor to an identified transferee;
  generating, for each device, an ephemeral device transfer token as the output of an elliptic-curve Diffie-Hellman cryptographic function having input including an attribute of the device, wherein the ephemeral device transfer token for each device is only valid over a limited period of time to authorize a transfer of ownership of the device from the transferor to the transferee;
  forming a file containing, for each device, the device attribute and the ephemeral device transfer token;
  providing the file to the transferor for delivery to the transferee; and
  modifying, for each device, a device ownership record to transfer ownership of the device from the transferor to the transferee in response to receiving the file from the transferee during the limited time period, wherein the file received from the transferee contains, for each device, the ephemeral device transfer token.

12. The computer program product of claim 11, the operations further comprising:
  permitting only the transferor to take an ownership action on the plurality of devices prior to modifying the device ownership record; and
  permitting only the transferee to take the ownership action on the plurality of devices subsequent to modifying the device ownership record.

13. The computer program product of claim 12, wherein the ownership action is activating the device for operation, logging in to the device, installing a software application on the device, and/or erasing data from the device.

14. The computer program product of claim 11, wherein the plurality of devices under management are independently selected from a server, switch, storage area network, and/or network attached storage.

15. The computer program product of claim 11, wherein, for each of the plurality of devices, the ephemeral device transfer token is generated using a first timestamp, a shared secret number, an attribute of the device, a transferor identity key, a transferee identity key, and a cloud portal identity key, the operations further comprising:
  generating, for each of the plurality of devices, a verification token using the elliptic-curve Diffie-Hellman cryptographic function, wherein, for each of the plurality of devices, the verification token is generated using a second timestamp, the shared secret number, the attribute of the device received in the file, the opposite key of the transferor identity key, the opposite of the transferee identity key, and the opposite of the cloud portal identity key, and wherein, for each of the plurality of devices, the operation of modifying the device ownership record to transfer ownership of the device from the identified transferor to the identified transferee is performed only upon determining that the ephemeral device transfer token for the device received from the transferee is the same as the verification token generated for the device.

16. The computer program product of claim 11, wherein, for each of the plurality of devices, the ephemeral device transfer token for the device is generating by:
  obtaining a first elliptic-curve cryptography private seed as the output of a key derivation function having input including a first timestamp, a shared secret number, and the device attribute of the device;
  obtaining a first ephemeral device transfer private key as the output of a cryptographically secure pseudo-random number generator using the first elliptic-curve cryptography private seed as input;
  calculating a first authorization code as the output of the elliptic-curve Diffie-Hellman function having input from a transferor identity private key and a cloud portal identity public key;
  calculating a second authorization code as the output of the elliptic-curve Diffie-Hellman function having input from the first ephemeral device transfer private key and the cloud portal identity public key; and
  calculating a third authorization code as the output of the elliptic-curve Diffie-Hellman function having input from the first ephemeral device transfer private key and a transferee public key, wherein the ephemeral device transfer token for the device is the output of the key derivation function having input including the first authorization code, the second authorization code, and the third authorization code.

17. The computer program product of claim 16, wherein, for each of the plurality of devices, the operation of modifying the device ownership record to transfer ownership of the device from the identified transferor to the identified transferee is performed only upon verification of the ephemeral device transfer token for the device received from the transferee, wherein, for each of the plurality of devices, verification includes:
  obtaining a second elliptic-curve cryptography private seed as the output of the key derivation function having input including a second timestamp, the shared secret number, and the device attribute of the device received in the file;
  obtaining a second ephemeral device transfer private key as the output of the cryptographically secure pseudo-random number generator using the second elliptic-curve cryptography private seed as input;
  obtaining a second ephemeral device transfer public key as the output of the public key generator using the second ephemeral device transfer private key and the predetermined elliptic-curve parameters;
  calculating a first authorization code as the output of the elliptic-curve Diffie-Hellman function having input from a transferor identity public key and a cloud portal identity private key;
  calculating a second authorization code as the output of the elliptic-curve Diffie-Hellman function having input from the second ephemeral device transfer public key and the cloud portal identity private key; and
  calculating a third authorization code as the output of the elliptic-curve Diffie-Hellman function having input from the second ephemeral device transfer private key and a transferee private key, wherein the verification token for the device is the output of a key derivation function having input including the first authorization code, the second authorization code, and the third authorization code.

18. The computer program product of claim 17, wherein the file is received over a first communication medium and the shared secret number is received over a second communication medium that is different from the first communication medium, wherein the first and second communication mediums include email, instant messaging, text messaging, phone call, or shared cloud storage.

19. The computer program product of claim 17, wherein the first timestamp is captured at the time that the first elliptic-curve cryptography private seed is obtained, and wherein the second timestamp is captured at the time that the second elliptic-curve cryptography private seed is obtained.

20. The computer program product of claim 17, wherein the device attribute is a device Serial Number, device Model Number, device Media Access Control address, device memory Serial Number, Secure Digital card attribute, and/or Trusted Platform Module attribute.

\* \* \* \* \*